(12) United States Patent
Li

(10) Patent No.: US 6,725,227 B1
(45) Date of Patent: Apr. 20, 2004

(54) ADVANCED WEB BOOKMARK DATABASE SYSTEM

(75) Inventor: Wen-Syan Li, Fremont, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/184,759

(22) Filed: Nov. 2, 1998

Related U.S. Application Data

(60) Provisional application No. 60/102,802, filed on Oct. 2, 1998.

(51) Int. Cl.[7] .............................................. G06F 17/30
(52) U.S. Cl. ........................................ 707/102; 715/513
(58) Field of Search ............................. 707/102, 513; 715/513

(56) References Cited

U.S. PATENT DOCUMENTS

| | | | | |
|---|---|---|---|---|
| 5,335,346 A | * | 8/1994 | Fabbio ........................ | 711/163 |
| 5,845,067 A | * | 12/1998 | Porter et al. ................... | 707/9 |
| 5,966,531 A | * | 10/1999 | Skeen et al. .................. | 709/315 |
| 6,055,570 A | * | 4/2000 | Nielsen ........................ | 709/224 |
| 6,061,692 A | * | 5/2000 | Thomas et al. ............. | 707/200 |
| 6,078,924 A | * | 6/2000 | Ainsbury et al. ........... | 707/101 |
| 6,212,522 B1 | * | 4/2001 | Himmel et al. ............... | 707/10 |
| 6,253,217 B1 | * | 6/2001 | Dourish et al. ............. | 707/500 |
| 6,308,188 B1 | * | 10/2001 | Bernardo et al. ........ | 707/501.1 |
| 6,327,574 B1 | * | 12/2001 | Kramer et al. ................ | 705/10 |

* cited by examiner

Primary Examiner—Wayne Amsbury
(74) Attorney, Agent, or Firm—Sughrue Mion, PLLC

(57) ABSTRACT

An advanced bookmark database system provides query, re-organization, information sharing, view, and access control capabilities to manage bookmarks. In one embodiment of the bookmark database system of the present invention, HTML document parsing, keyword extraction, and HTML/VRML document generation capabilities are provided, in addition to allowing comprehensive database query and navigation. The bookmark database system extracts document content semantics, intra-document structures, inter-document linkage, and useful metadata for users to allow query and organization based on various attributes, such as keywords, domains, and last visit times. Further, an access control capability allows sharing of bookmark databases among users. Multiple physical or logical bookmark databases can be merged to create new bookmark databases. Multiple bookmark databases can be organized as a hierarchical structure, to allowing grouping by individuals, projects, groups, departments, etc. Automated query dispatch and dynamic links capabilities are provided. Dynamic links cross references multiple bookmark databases according to bookmark content semantics or other criteria. A user interface provides visualizing models for organizing accessible physical or logical bookmark databases.

56 Claims, 21 Drawing Sheets

FIG. 4

Query Results — 400

| No. | URL | Title |
|---|---|---|
| 1 | http://www.nba.com/nbaat50/images/gallery/arizin.html | NBA AT50: PAUL ARIZIN |
| 2 | http://www.majorleaguebaseball.com/mlbi/puerto.htm | Puerto Rico |
| 3 | http://www.nfl.com/Bengals/club/index.html | NFLCOM: Bengals Huddle |
| 4 | http://www.majorleaguebaseball.com/aldet/clubschd.sml | DET 1997 Season Scedule |
| 5 | http://www.nba.com/playerfile/terrell_brandon.html | Terrel Brandon Player File: Cavs |
| 6 | http://www.nba.com/playerfile/jerome_allen.html | Nuggets Player File: Jerome Allen |
| 7 | http://www.nba.com/playerfile/jeff_hornacek.html | Jeff Hornacek Player File: Jazz |
| 8 | http://www.nba.com/nbaat50/moments/wilt_100.html | NBA at 50: Wilt Scores 100! |
| 9 | http://www.nba.com/nbaat50/greats/ppettit.html | NBA AT 50: BOB PETTIT |
| 10 | http://www.nba.com/news_feat/pow_1230.html | NEWS & FEATURES: PLAYER OF THE WEEK: TIM HARDAWAY |
| 11 | http://www.majorleaguebaseball.com/bios/004645.sml | Player Biography Kevin Foster |
| 12 | http://www.nfl.com/patriots/plaoffs/games13.html | NFLCOM: Patriots – Playoff history |
| 13 | http://www.nba.com/news_feat/malone_top10.html | News & Features: Malone Delivers Another Milestone |
| 14 | http://www.nfl.com/Cowboys/club/index.html | NFLCOM: Cowboys Corner |
| 15 | http://www.nba.com/playerfile/dennis_rodman.html | Bulls Player File: Dennis Rodman |
| 16 | http://www.majorleaguebaseball.com/nt/col/stadium.sml | Stadium Information |
| 17 | http://www.nba.com/playerfile/profile/mitch_richmond_cp.html | Kings Career Profile: Mitch Richmond |
| 18 | http://www.nfl.com/media/audio/ram/bears/week6/wanstd2.ram | |
| 19 | http://www.nba.com/playerfile/carl_thomas.html | Cavs Player File: Carl Thomas |
| 20 | http://www.nba.com/playerfile/profile/clyde_drexier_cp.html | Rockets Career Profile: Clyde Drexier |

[ Browse ]  [ Slide Show First 10 ]  [ Save As A BookMark ]—402  [ Collect into WebDB! ]—401  [ Stop ]  [ Dismiss ]

FIG. 5(a)

Table 1:  Summary Metadata for a Database

| Attribute name | Data Type | Description |
|---|---|---|
| Database Description | String | High-level description |
| Number of Documents | Interger | document coverage |
| Number of Domains | Interger | domain coverage |
| Average number of Documents per domain | Interger | |
| Significant Domains based on frequency | List of String | Sorted by visit frequencies S |
| Significant Domains based on Link | List of String | Sorted by number of links to pages in this database |
| Significant Keyword | List of String | Most representative keywords in database contents |
| Average freshness | Interger | Average age of documents in the database |
| Average downloading time | Interger | Estimation of downloading time for documents |
| Access frequency | Interger | Usage frequency of the database |
| SubDBs | Set of String | Virtual database hierarchy |
| SuperDBs | Set of String | Virtual database hierarchy |
| ACL | Set of String | User IDs with access permission to this DB |

FIG. 5(b)

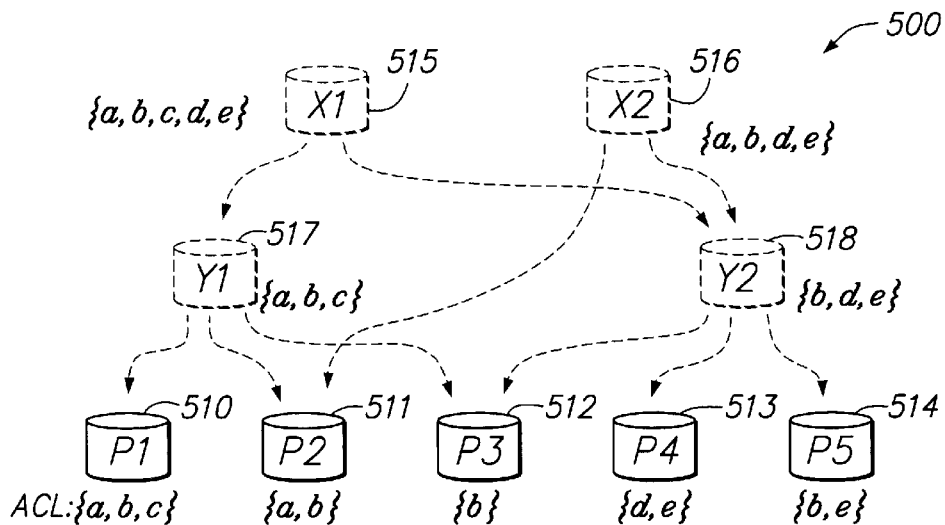

FIG. 5(c)

| Attribute name | Data Type | Description |
| --- | --- | --- |
| ⋮ | ⋮ | ⋮ |
| 504 — Significant Keyword | List of String | For associating databases based on semantics |
| ⋮ | ⋮ | ⋮ |
| 502 — SupDBs | Set of String | For constructing semantic view hierarchy |
| 501 — SubDBs | Set of String | For construction semantic view hierarchy |
| 503 — Access Control List | Set of String | User IDs with access permission to this DB |
| 541 — Semantic Definition | Set of String | A set of keywords representing semantic content |
| 542 — Semantic Detail | FLAG | Database level/Document level |

FIG. 6

Algorithm *VExp:* View Expansion with Access Control
Input: $N$: a node on the database hierarchy;
    $U$: a user id.
Output: $S$: set of physical databases accessible to the user.
Method:

(1)   $S \leftarrow \phi$ (2) if $U \in N.ACL$:

(3)   if $N.SubDBs = \phi$:

(4)     $S \leftarrow \{N\}$ (5)   else:

(6)     for $D \in N.SubDBs$:

(7)       $S \leftarrow S \cup VExp(D,U)$ (8) return $S$

FOR EACH $P_i \in$ *SignificantKeyboardIndex.Lookup (S.SemanticDefinition)* DO
BEGIN
    $P_i.SupDBs = P_i.SupDBs \;\gamma\{S\}$;
    $S.SubDBs = S.SubDBs \;\gamma\{P_i\}$;
    IF *materialize*$(S,P_i)$ THEN
    BEGIN
        $QueryResult$=Select $D$ FROM $P_i$;
        $S.Docs = S.Docs \;\gamma\; QueryResults$;
    END;
END.

FIG. 11

```
BEGIN
    (* View maintenance invoked when a document d is inserted (deleted) in (from) a database P_i *)
    OldKeywords = P_i.SignificantKeywords;
    Update(P_i,d,insert/delete);
    (* if a word is deleted from significant keywords, update affected semantic views S *)
    DeletedWords = OldKeywords \ P_i.SignificantKeywords;
    FOR EACH S ∈ SemanticDefinitionIndex.Lookup(DeletedWords) DO
    BEGIN
        P_i.SupDBs=P_i.SupDBs\{S};
        S.SubDBs=S.SubDBs\P_i;
        IF materialize(S,P_i) THEN
        BEGIN
            QueryResults=Select D FROM P_i;
            ADD/DELETE d FROM QueryResult;
            S.Docs=S.Docs\QueryResult;
        END; (* IF *)
    END;(* FOR EACH *)
    (* if a word is inserted into significant keywords, update affected semantic views S *)
    InsertedWords = P_i.SignificantKeywords \ OldKeywords;
    FOR EACH S ∈ SemanticDefinitionIndex.Lookup(InsertedWords) DO
    BEGIN
        P_i.SupDBs=P_i.SupDBs Y {S};
        S.SubDBs=S.SubDBs Y P_i;
        IF materialize (S,P_i) THEN
        BEGIN
            QueryResult = Select D FROM P_i;
            ADD/DELETE d FROM QueryResult;
            S.Docs = S.Docs Y QueryResults;
        END; (* IF *)
    END; (* FOR EACH *)
    (* Insert/delete the document d in the parent semantic views S *)
    FOR EACH S ∈ P_i.SupDBs DO
    BEGIN
        IF materialize(S,Pi) THEN
        BEGIN
            ADD/DELETE d FROM S.Docs;
        END (* IF *);
    END; (* FOR EACH *)
END.
```

```
FOR EACH P_i ∈ WebDB  ASSCESSIBLE TO  S.AccessControlList  DO
BEGIN
    QueryResult = SELECT D FROM P_i WHERE D.keyword ∩ S.SemanticDefinition ≠ φ;
    IF QueryResult ≠ φ THEN
    BEGIN
        S.Sub DBs = P_i;
        P_i.Sup DBs = S;
        IF materialize (S,P_i) THEN S.docs = S.docs γ QueryResult;
    END.
END.
```

FIG. 14

*Netscape: WebDBJavaInterface*

File  Edit  View  Go  Communicator                                                         Help Back  Forward  Reload  Home  Search  Netscape  Images  Print  Security  Stop Bookmarks  Location: file:/home/picasso/ywu/papers/ICDE99/WebDBJavaInterface/WebDBJavaInterface.html File  Search  Parameter  Run Query  Edit  Help Mail Query | Link-In Query | Link-Out Query | Query Result | DataBase Selection | Bookmark | Semantic DataBase Selection Separation — Cell Space — Action
☑ Horiz. Lines   Inter-cell spacing: ☐ Bookmark
☑ Vert. Lines   Row height          ☑ Browse
                                     ☐ Collect
                                     [Go]

1401 ⌐                                                          ⌐ 1402                                              ⌐ 1403

| URL | Refresh Frequ... | Last Modified | Remarks | Last Refre... | Data Source | Last Visit | Visit |
|---|---|---|---|---|---|---|---|
| www.nec.com/company... | twice a month | Feb 13, 1997 4:16 | Not Recommend.. | 44 | 2nd Computer S/W Di.. | Feb 13, 1... | 19 |
| www.nec.com/1005.html... | auto | May 18, 1998 10:21 |  | 2 | C&C Research Lab | May 13, 1... | 30 |
| www.nec.com/hecl/ht... | twice a month | Feb 13, 1997 4:16 | media/ad1.html | 99 | CCRL San Jose | Feb 13, 1... | 4 |
| www.nec.com/company... | per month | Feb 13, 1997 4:16 | First class | 838 | C&C Research Lab | Jun 13, 1... | 13 |
| www.nec.com/2skupp... | auto | May 18, 1999 10:21 | see also: http://ww | 8 | CCRL San Jose | Feb 13, 1... | 51 |
| www.nec.com/newave... | auto | Feb 13, 1997 4:16 | very helpful | 3 | Networking Group | Jun 13, 1... | 6 |
| www.nec.com/nectech... | auto | Feb 13, 1997 4:16 | Check at lease oc | 7 | Software Development | May 13, 1... | 1 |
| www.nec.com/newave... | per month | Feb 13, 1998 4:16 |  | 21 | Hypermedia Group | May 13, 1... | 22 |
| www.nec.com/company... | auto | May 18, 1998 10:21 |  | 1 | C&C Redreach Lab | May 13, 1... | 7 |
| www.nec.com/company... | 5 | Feb 13, 1997 4:16 | Check at lease onc | 14 | CCRL San Jose | Jun 13, 1... | 18 |
| www.nec.com/necm/... | per month | Oct 9, 1997 8:52 |  | 12 | Software Development | May 13, 1... | 11 |
| www.nec.com/company... | auto | Feb 13, 1997 4:16 | First Rate | 8 | Hypermedia Group | Feb 13, 1... | 23 |
| www.nec.com/company... | per month | May 18, 1998 10:21 |  | 44 | 2nd Computer S/W D... | Feb 13, 1... | 34 |
| www.nec.com/1005.html... | per week | May 18, 1998 4:16 |  | 2 | C&C Research Lab | Feb 13, 1... | 18 |
| www.nec.com/ntcal/ht... | twice a month | None |  | 98 | CCRL San Jose | Feb 13, 1... | 53 |
| www.nec.com/company... | twice a month | Feb 13, 1997 4:16 | Five Stars | 830 | C&C Research Lab | Jun 13, 1... |  |

```
(* View Maintenance is invoked whenever a document d is inserted/deleted from P_i *)
FOR EACH S ∈ SemanticDefinitionIndex.Lookup(d.keyword) THEN
BEGIN
    IF d INSERTED IN P_i THEN
    BEGIN
        S.SubDBs = S.SubDBs ⋃ {P_i};
        P_i.SupDBs = P_i.SupDBs ⋃ {S};
        IF materialize(S,P_i) THEN S.docs = S.docs ⋃ {d};
    END;
    ELSE IF d DELETED FROM P_i THEN
    BEGIN
        IF materialize(S,P_i) THEN S.docs = S.docs \ {d};
        QueryResult = SELECT D FROM P_i WHERE D.keyword ⋂ S.SemanticDefinition ¬= ϕ;
        IF Query Result = ϕ THEN
        BEGIN
            S.SubDBs = S.SubDBs \ {P_i};
            P_i.SupDBs = P_i.SupDBs \ {S};
        END;
    END; (* IF *)
END.
```

FIG. 16(a) Mix Database Hierarchy (Organization View)
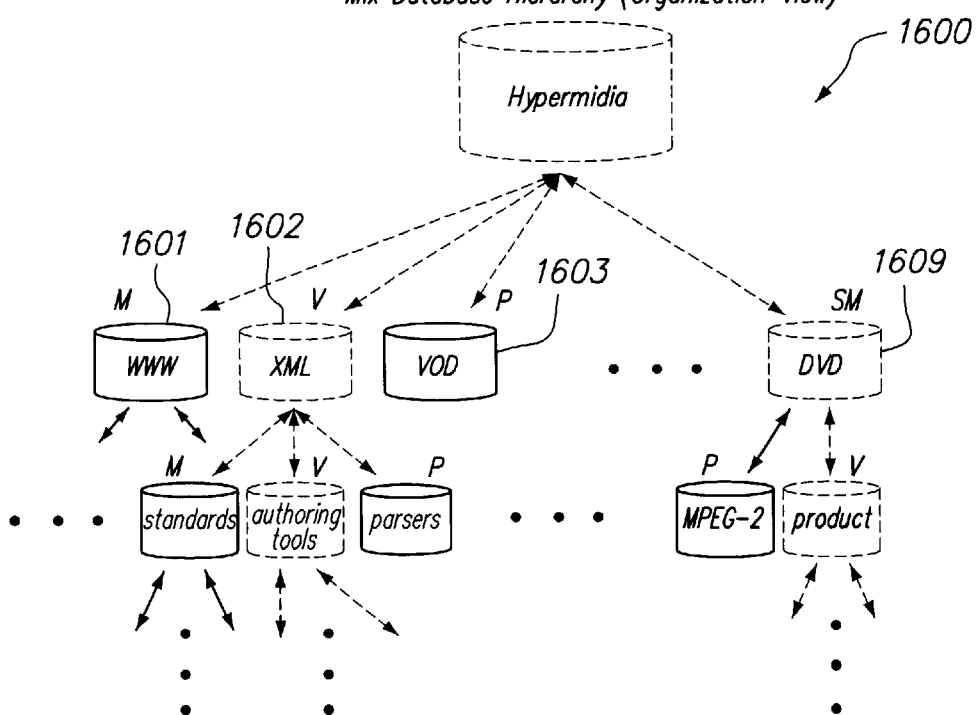
FIG. 16(b) Mix Database Hierarchy (Query Processing View)
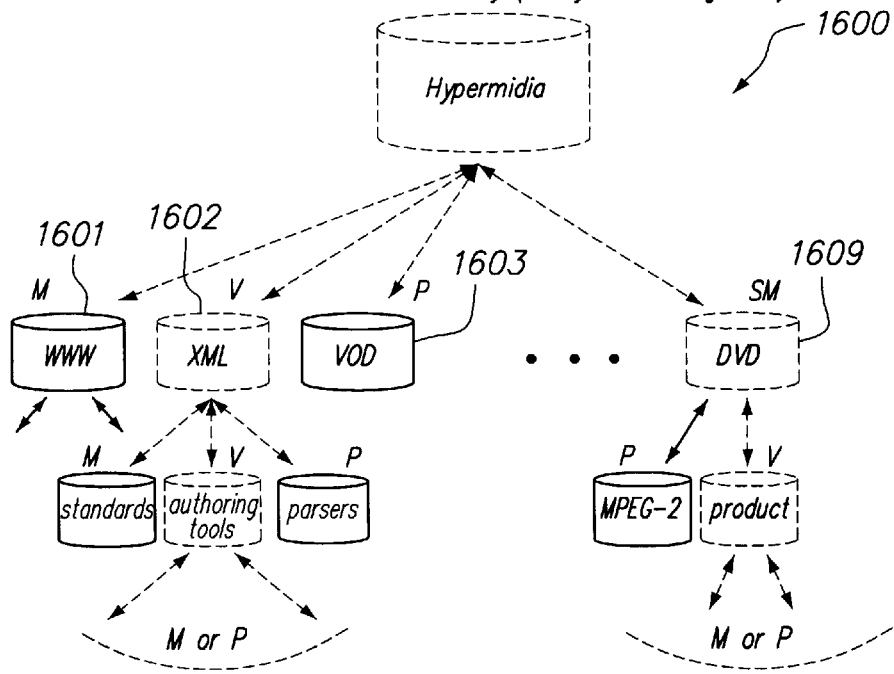
Legend: V: Virtual   P: Physical   M: Materialized   SM: Semi-Materialized

FIG. 19

Query Results — 1900

| Type | No. | Date | URL | Title |
|---|---|---|---|---|
| New | 1 | 8/26/998 | http://www.nba.com/nbaat50/images/gallery/arizin.html | NBA AT50: PAUL ARIZIN |
| New | 1 | 8/26/998 | http://www.majorleaguebaseball.com/mlbi/puerto.htm | Puerto Rico |
| New | 1 | 8/26/998 | http://www.nfl.com/Bengals/club/index.html | NFLCOM: Bengals Huddle |
| New | 1 | 8/26/998 | http://www.majorleaguebaseball.com/aldet/clubschd.sml | DET 1997 Season Scedule |
| New | 1 | 8/26/998 | http://www.nba.com/playerfile/terrell_brandon.html | Terrell Brandon Player File: Cavs |
| New | 1 | 8/26/998 | http://www.nba.com/playerfile/jerome_allen.html | Nuggets Player File: Jerome Allen |
| New | 1 | 8/26/998 | http://www.nba.com/playerfile/jeff_hornacek.html | Jeff Hornacek Player File: Jazz |
| New | 1 | 8/26/998 | http://www.nba.com/nbaat50/moments/wilt_100.html | NBA at 50: Wilt Scores 100! |
| New | 1 | 8/26/998 | http://www.nba.com/nbaat50/greats/ppettit.html | NBA AT 50: BOB PETTIT |
| New | 1 | 8/26/998 | http://www.nba.com/news_feat/pow_1230.html | NEWS & FEATURES: PLAYER OF THE WEEK: TIM HARDAWAY |
| New | 1 | 8/26/998 | http://www.majorleaguebaseball.com/bios/004645.sml | Player Biography Kevin Foster |
| New | 1 | 8/26/998 | http://www.nfl.com/patriots/plaoffs/games13.html | NFLCOM: Patriots – Playoff history |
| New | 1 | 8/26/998 | http://www.nba.com/news_feat/malone_top10.html | News & Features: Malone Delivers Another Milestone |
| New | 1 | 8/26/998 | http://www.nfl.com/Cowboys/club/index.html | NFLCOM: Cowboys Corner |
| New | 1 | 8/26/998 | http://www.nba.com/playerfile/dennis_rodman.html | Bulls Player File: Dennis Rodman |
| New | 1 | 8/26/998 | http://www.majorleaguebaseball.com/nt/col/stadium.sml | Stadium Information |
| New | 1 | 8/26/998 | http://www.nba.com/playerfile/profile/mitch_richmond_cp.html | Kings Career Profile: Mitch Richmond |
| New | 1 | 8/26/998 | http://www.nfl.com/media/audio/ram/bears/week6/wanstd2.ram | |
| New | 1 | 8/26/998 | http://www.nba.com/playerfile/carl_thomas.html | Cavs Player File: Carl Thomas |
| New | 1 | 8/26/998 | http://www.nba.com/playerfile/profile/clyde_drexier_cp.html | Rockets Career Profile: Clyde Drexier |

[Browse] [Save As A BookMark] [Delete] [Collect Into WebDB!] [Stop] [Dismiss]

ADVANCED WEB BOOKMARK DATABASE SYSTEM

CROSS-REFERENCE TO RELATED PATENT APPLICATIONS

The present application is related to, and claims priority to, provisional patent application, entitled "Advanced Web Bookmark Database System," serial No. 60/102,802, filed Oct. 2, 1998, which is assigned to NEC USA, Inc., also the assignee of the present application.

BACKGROUND OF THE INVENTION

1. Field of the Invention

The present invention relates to automated tools for information management. In particular, the present invention relates database system for managing documents accessible locally (e.g., over an intranet) and remotely (e.g., over the Internet).

2. Discussion of the Related Art

Vast amount of information is published on the Internet or within the corporate intranets. Individuals and business organizations are increasingly relying on the Internet or corporate intranets for information retrieval and dissemination. For example, a research staff member at a major corporation may follow recent announcements about a particular product; a human resource staff member may post bulletins on an intranet, and retrieve labor regulation updates from government agency web sites.

To manage the information received and disseminated, users need tools which can provide more effective and reliable information organization, sharing, and management capabilities than those available from current search engines. For example, using a generic search engine to perform corporate tasks will result in a significant loss of productivity because finding relevant information via such a search engine, if not impossible, is a time-consuming process.

Thus, a need arises to provide services for efficient document management for the documents on the Internet and these intranets. In particular, efficient querying and retrieval tools are needed for locating information that exists in corporate networks. Generic search engines are inadequate for supporting complex queries against corporate data and lack information organization capabilities. Traditional database management systems(DBMS), which allow complex queries and support data management and organization, are inadequate to support the poorly structured and poorly organized documents and sources, such as those related by the World Wide Web ("Web"). Further, conventional database systems fail to take advantage of subscription-notification services, which notify and update subscribers as information is published, to customize Web access and to filter out irrelevant information.

Also, in a business environment, sophisticated access control to information is necessary. For example, control access to information by individuals, projects, and departments is desirable. In addition, it is also desirable to access information, not only on the basis of keywords, but also on the basis of other contents such as images, tables, forms, and link information. Such alternative access schemes require a comprehensive query support and effective data management. Further, people who work together may want their individual repositories of information shared and pooled in the form of a project repository.

SUMMARY OF THE INVENTION

In accordance with one embodiment of the present invention, a document management system is provided for organizing, sharing and managing Web and intranet documents efficiently. In that document management system, users store documents in databases which can be queried based on both document content and intra-document structures and inter-document links. In addition, access control allows users to share databases, or to create additional databases by logically combining multiple physical or logical databases.

In one embodiment, the database of the present invention allows a hierarchical organization of information, based on semantics and corporate organizational structure. A user can query and navigate his or her own document databases and other accessible document databases using automated query processing and dynamic links facilities. Dynamic links cross-reference multiple document databases using content semantics or other criteria. Accordingly, efficient sharing of information in the work place is achieved.

The present invention can be carried out using various algorithms for query processing and access control. In addition, a document management system of the present invention integrates a subscription-notification service to update, in a timely manner, information received from the Internet and intranets. Further, the present invention also provides a tool which assists users in visualizing and organizing accessible Web document databases and their contents.

In one embodiment of the present invention, queries based on document metadata, intra-document structures, and inter-document links are supported. Query processing under the present invention provides performance and reliability far exceeding those attained by conventional Web search engines using keyword searches.

The present invention supports information sharing. To that end, a document management system of the present invention allows users to create and organize individual databases in a hierarchy fashion to reflect the organizational structure and to allow workspace collaboration.

The present invention is better understood upon consideration of the detailed description below and the accompanying drawings.

BRIEF DESCRIPTION OF THE DRAWINGS

FIG. 4 shows a query result browsing window 400.

FIG. 5(a) shows Table 1, which includes definitions of meta-information of a database, in one implementation of WebDB 112.

FIG. 5(b) shows a hierarchical structure of databases in WebDB 112 as a directed acyclic graph.

FIG. 5(c) shows Table 2, which includes definitions of meta-information extending the attributes of Table 1 to include semantic meta-data extensions.

FIG. 6 provides an algorithm Vexp, which is a function for view expansion, taking into consideration access control associated with each logical or physical database.

FIG. 11 shows an algorithm for maintaining a view mapping for a virtual semantic view

FIG. 14 shows a user interface ("Document Level Semantic View Browsing Interface") 1400 for administering a document level semantic view.

FIG. 15 shows an algorithm for maintaining a document level semantic view when a document is inserted or deleted from a document database.

FIG. 16(a) illustrates a semantic hierarchy in which a virtual semantic view 1600 ("Hypermedia") is organized in terms of other semantic views (viz. "WWW," "XML," "VOD," etc.)

FIG. 16(b) is a view of the semantic hierarchy of FIG. 16(a) from a query processing point of view

FIG. 19 shows an image 1900 of a query result obtained by the subscription-notification mechanisms of FIGS. 18 and 20.

In the detailed description below, like elements are provided like reference numerals.

DETAILED DESCRIPTION OF THE PREFERRED EMBODIMENTS

Figure 1:
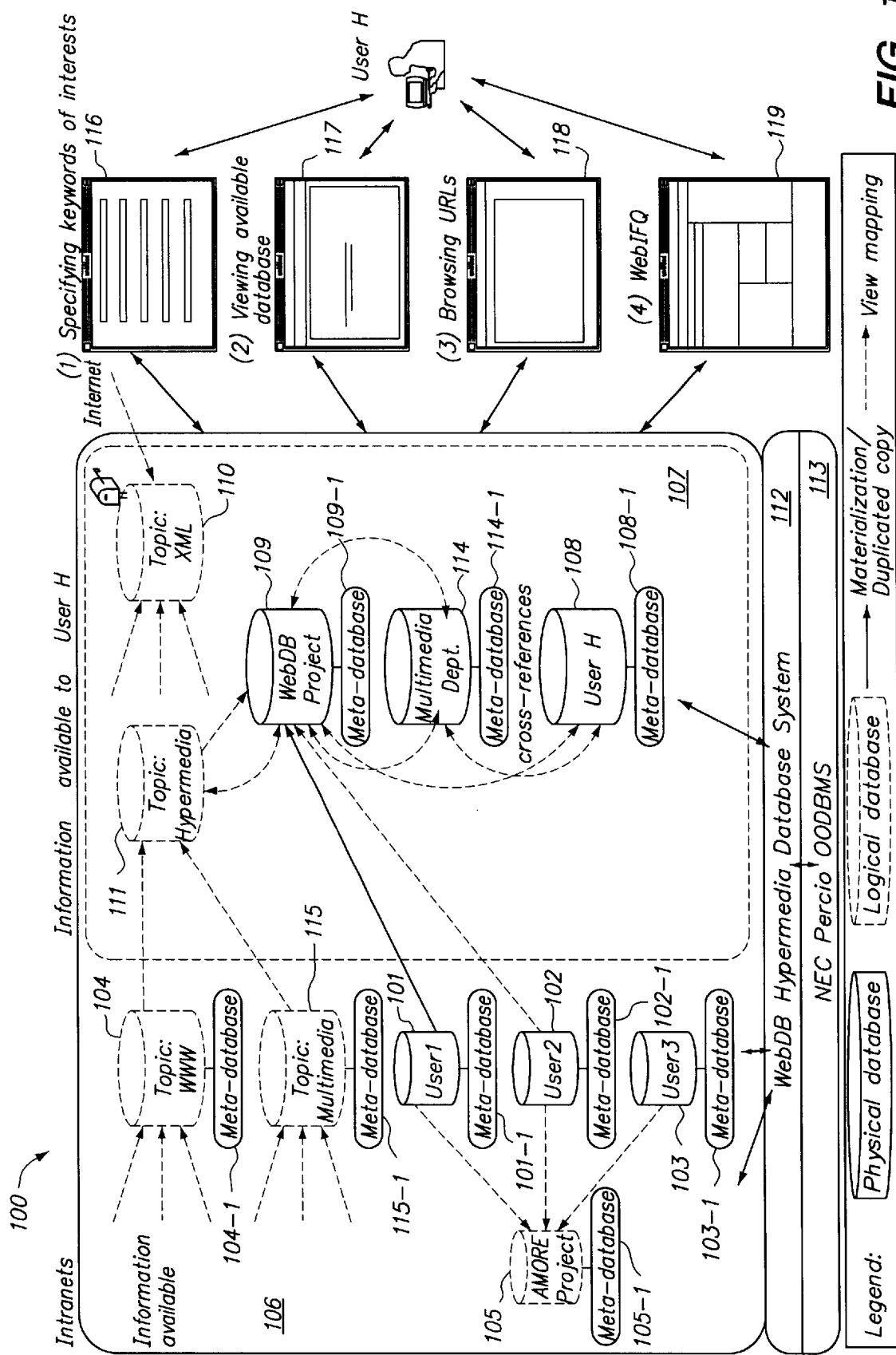
FIG. 1 shows a hierarchy of user databases in document management system 100, including a hypermedia database system ("WebDB") 112 in accordance with the present invention.

One embodiment of the present invention is illustrated by a document management system 100 of FIG. 1. FIG. 1 shows document management system 100 as a database system including five physical user databases 101, 102, 103, 114 and 108 (respectively labeled respectively "user1", "user2", "user3", "user H", and "Multimedia Department") and their associated meta-information structures 101-1, 102-1, 103-1, 114-1 and 108-1, that respectively describe the databases. Document management system 100 allows documents to be queried based on both the document content and intra-document structures and inter-document links. Conventionally, such a database system can be organized in one or more ways. For example, such a system can be organized as a large centralized repository for an enterprise. Alternatively, individual user or group in the enterprise can create and manage their own repositories.

In document management system 100, logical databases or views (indicated in FIG. 1 by dotted lines, e.g. databases 104, 115, 111 and 119) can be created by a union of constituent physical databases. Conventionally, a logical database is organized by pointers or references to documents in physical databases. In document management system 100, a logical database can also be organized by pointers or references to physical or logical databases. In addition, document management system 100 provides additional tools and services to organize, share, and manage the databases and their contents are needed. For example, in FIG. 1, databases 101, 102 and 103, belonging to a group of users (i.e., "user1", "user2", and "user3") involved in a project "AMORE" integrate their individual repositories to form a project repository. Similarly, a user involved in multiple projects can include his/her repository in all eligible projects (e.g., user1 of FIG. 1 includes database 101 in logical project databases 105 ("AMORE") and 109 ("WebDB")). Additionally, several project repositories may need to be integrated to create a departmental repository.

In document management system 100, a user can define a logical database based on semantic constraints, such as by "topic of interest". For example, databases "WWW" (104), "Hypermedia" (111) and "Multimedia" (115) for documents related to WWW, hypermedia and multimedia respectively. Logical databases are also associated with meta-information, indicated in FIG. 1 as meta-information 104-1, 111-1 and 115-1. Document management system 100 supports queries that go across several physical or logical databases, or which search based on a particular topic subset. Thus, specific databases can be created for specific topics of interests of document management system 100's users. For example, in FIG. 1, logical databases resulting from retrieved documents or subscription based on topics of interest include databases 110 and 111 (i.e., specified by keywords "XML" and "Hypermedia").

Document management system 100 also provides a graphical user interface 150. Graphical user interface 150 includes a general administrative interface ("Database Viewer"). The Database Viewer (e.g., forms 116, 117 and 118 of FIG. 1) allows the user to specify database or domain to view or administrate, to specify a keywords and queries to retrieve or subscribe to specific Web documents or to view, query and organize the databases. A query language WQL, which is based on the well-known query language SQL3, is provided for use with document management system 100, and a visual interface called "WebIFQ" (for "Web in-frame query") is provided to assist the user in pose complex WQL queries). An example form for WebIFQ is shown as form 119 of FIG. 1.

In a shared environment, access control is provided to both protect privacy and to promote information sharing. For example, in FIG. 1, User H has access to his own database (i.e., physical database 108), the multimedia department database (i.e., physical database 114), and logical database 109 (labeled "WebDB project"), but not other information.

Document management system 100 includes a subscription-notification service. The subscription-notification service allows a user to subscribe to information on the Internet or in the intranet. As new information is provided by the subscription, the user is notified, using a mechanism similar to electronic mail. Form 116 of FIG. 1 can be used to specify a subscription. Form 116 allows a user to specify intranet databases of interest, Web domains (provided as universal resource locators ("URLs") to subscribe, and subscription queries using keywords. The document subscription for the URLs on the Internet is performed through a search engine, such as HotBot. In addition, through form 116, the user can specify how time critical the subscription is. For example, for documents on an intranet, the user can specify various frequencies such as "immediately" or "daily". For documents on the Internet, the user can specify "one week," "two weeks" or any other frequency. (Practically speaking, few documents are modified weekly; thus document management system 100 restricts users to specify the time frame to at least two weeks.)

Figure 21:
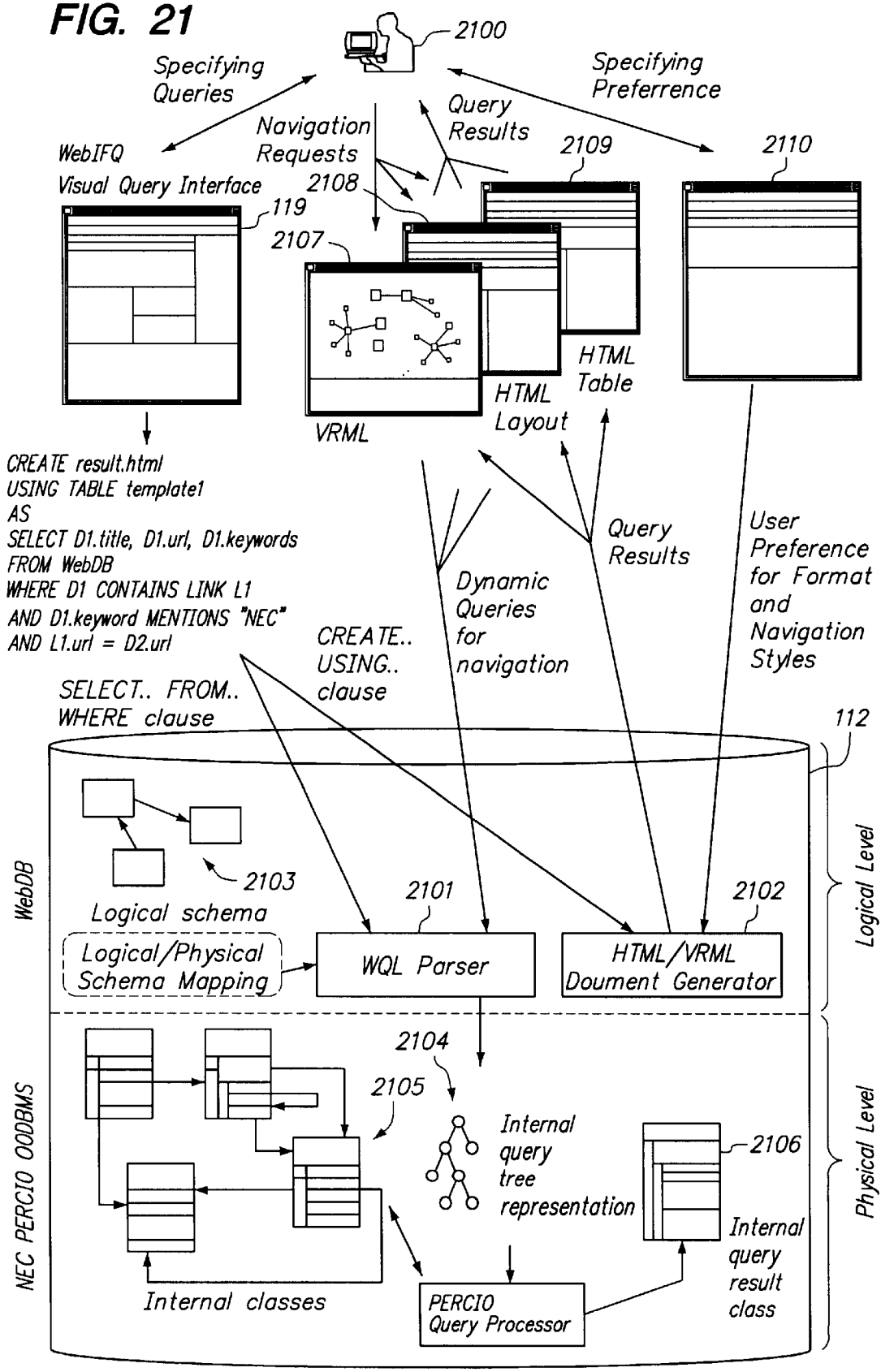
FIG. 21 illustrates the operation of document management system 100, in accordance with the present invention.

Document management system 100 is managed by a database management system including a logical level database management system ("WebDB") 112, and a physical database management system 113. Physical database management system 113 can be implemented, for example, by NEC PERCIO object-oriented database management system (OODBMS). The operation of document management system 100 is illustrated by FIG. 21. A logical-to-physical schema mapping 2103 provides a map between the logical organization of document management system 100 (maintained at WebDB 112) and the physical organization, implemented as classes (maintained at OODBMS 113). As shown in FIG. 21, a user 2100 issues a query to WebDB 112 using the WebIFQ interface (e.g., form 119). The query is received into a WQL parser 2101 of WebDB 112. WQL parser 2102, which can be viewed as a logical level query processor, translates the received query into an SQL query (shown in FIG. 21 as data structure 2104) understood by OODBMS 113, and substitutes references to WebDB's views to the physical classes of OODBMS 113. PERCIO OODBMS, which can be seen as a "physical level query processor", processes the SQL query and returns the result in a query result class 2106. Query result class 2106 is received into WebDB 112 by a HTML/Document Generator 2102. The results of query processing are presented to user 2100 in "Web forms" (i.e., documents in hypertext formats supported on the internet), such as HTML layout form 2103, HTML table form 2103 and a VRML form 2107. Since the query results could include links to documents in an intranet or the internet, User 2100 can further specify navigation requests to be processed by WQL parser 2101. A preference form 2110 is provided to facilitate user 2100 to configure WebDB 112 and to specify parameter values for WebDB 112.

Figure 2:
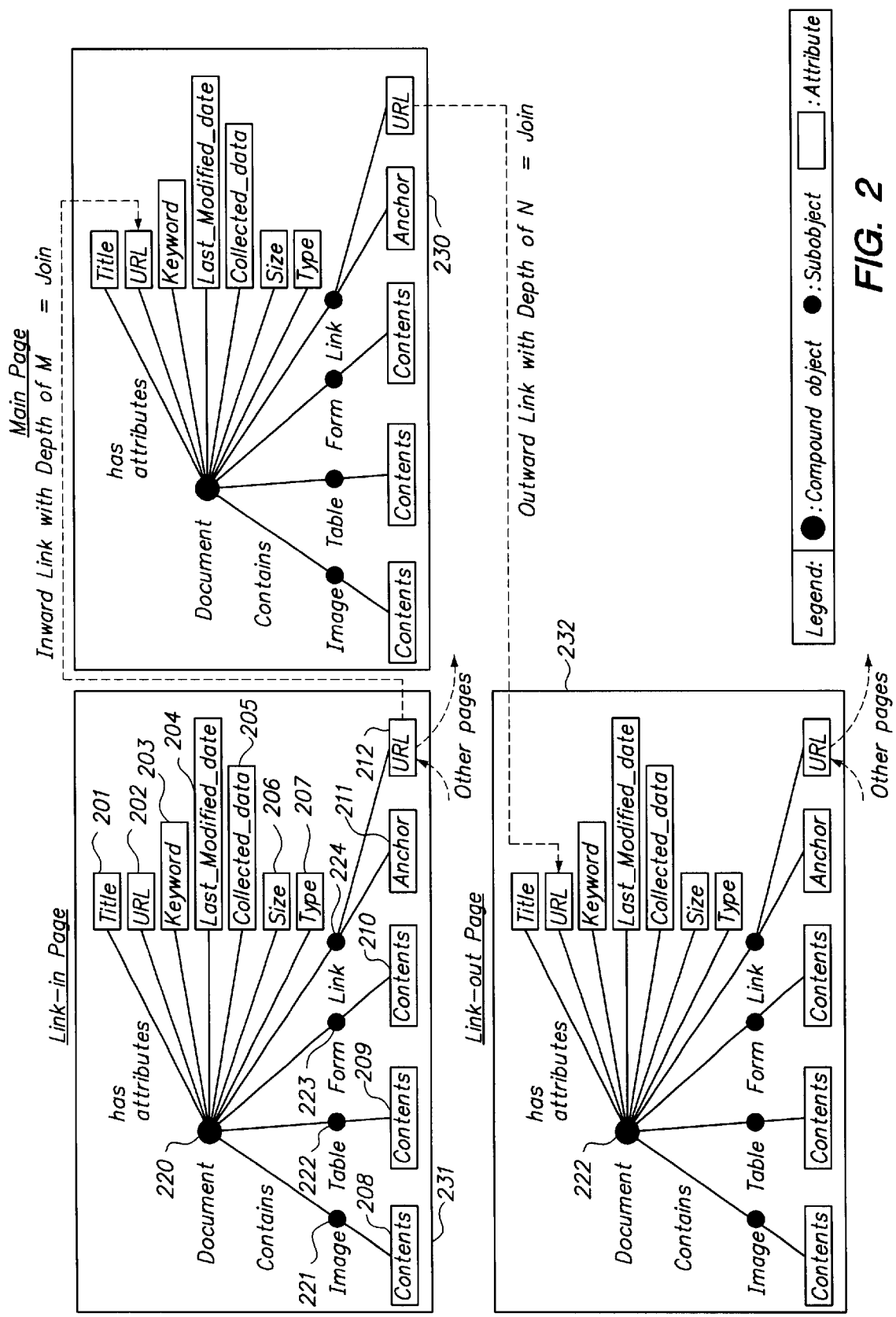
FIG. 2 illustrates the model and structure of Web entities in WebDB 112.

WebDB 112 models the world wide web ("Web") as a labeled directed graph $G_{web}=(V_{web}, E_{web})$, where the vertices is denote the document pages and the edges Es denote the hyperlinks between these pages. FIG. 2 illustrates the model and structure of Web entities in document management system 100. In WebDB 112, a Web document ("Doc") is modeled as a compound object with a hierarchical structure, with document level information, such as "title" (201), "URL" (202), "last modified date," (204) and "size," (206) modeled as the attributes of the Doc object 220.". Intra-document structures are modeled as sub-objects. In FIG. 2, Doc 220 contains sub-object "Form" (223), "Image" (221), "Table" (222) and "Link" (224). The relationship between Doc 220 and each of its sub-objects (e.g., sub-objects 221–224) is a relation "CONTAINS". Sub-objects can also have their own attributes. For example, attributes for "Image" are image metadata (i.e., "content" 208), and attributes for a "Form" and a "Table" are a form and a table ("contents" 210 and 219), respectively. Inter-document information is represented by sub-object "Link" (224), which has two attributes: "URL" 212 (for the destination URL) and "Anchor" 211. Therefore, an inter-document link from a Doc "Doc1" to another Doc "Doc2" is modeled through join operations on Doc1.Link.URL and Doc2.URL. A parameter "depth" can be specify for a join operation, defining the number of/join operations to be performed recursively. Similarly, intra-document links (i.e. tags) is modeled through join operations on $Doc_i$.Link.URL and $Doc_j$.URL. FIG. 2 shows the logical document modeling of three Docs: 230 ("Main"), 231 ("Link-in"), and 232 ("Link-out"). Doc 231 is a document having a link pointing to doc 230 (i.e., a document from which "Main" can be reached) and doc 232 is a document to which doc 230 has a link (i.e., a document reachable from "Main").

As mentioned above, WebIFQ provides a graphical user interface for specifying WQL queries. WQL queries are of the form (optional parts are indicated by square brackets):

SELECT <object attribute or sub-object attribute>
FROM <database name or names>
WHERE <search criteria>
[GROUP BY <Grouping criteria>]
[ORDER BY <ordering criteria>]

Projection operation and Aggregation operations (e.g., average, count, standard deviation etc.) are supported.

In this embodiment, a Doc and its intra-document structures are related by the predicate "Contains," and inter-document links are related by "join" operations, which can be implemented by pointers. In addition, a I.LIKE function is provided to match image sub-objects. Similarly, a S.LIKE function is provided to allow retrieval of documents using a keyword and words semantically related to the keyword. A co-occurrence function allows retrieval based on a keyword and other words occurring at a high frequencies with the keyword. Other methods, such as those based on natural language processing rules or vectors of information retrieval can be also used for searching and retrieval of documents. WebIFQ provides form 119, which allows the criteria related to the SELECT, FROM, WHERE, GROUP BY and ORDER BY be provided individually in fields. WebIFQ composes the WQL queries based on these fields.

Figure 3:
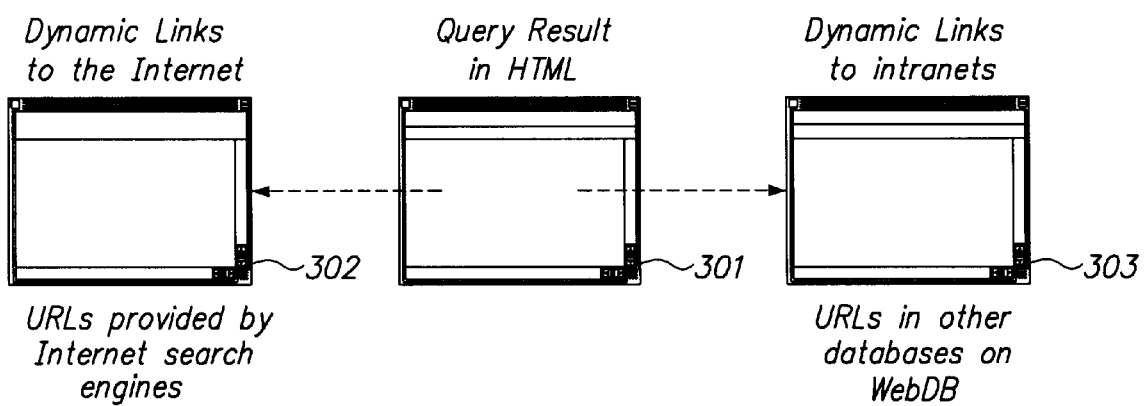
FIG. 3 shows query results of WebDB 112 cross-referencing related documents in the Internet and in databases of WebDB 112.

One advantage of information sharing on WebDB 112 is dynamic links, which cross-references related information. Essentially, WebDB 112 dynamically links together those documents with the same keywords. For instance, when returning results for a given query, WebDB 112 also shows the keywords for each result documents, as shown in FIG. 3. In FIG. 3, a query result is provided in HTML in the middle page 301, which is linked by keywords to two related documents 302 and 303 from the intranet and the Internet, respectively. (Since WebDB 112 is built on top of OODBMS, a keyword-document index is constructed and used for retrieving results as "cross-reference.") Internet document requests are forwarded to Internet search engines for resolution. When a user clicks on a keyword, WebDB 112 dynamically generates a related document list by evaluating a query that searches for documents with that keyword. Unlike static links, documents related by dynamic links are always up to date and complete. These cross-references further promote information sharing, because the related documents are linked across user or database boundaries.

As shown in FIG. 3, in WebDB 112, a query result can be returned by document generator 2102 (FIG. 21) as an HTML document in which certain attributes, such as keyword or title, are specified as anchors. WebDB 112 allows a user to customize navigation styles according to whether a page is in the Internet or in the intranet (i.e. WebDB 112). For example, given an anchor "NEC" in the Internet, clicking on the anchor results in a dynamic document request sent to an Internet search engine. The response of the search engine is received by a WebDB component that extracts URLs returned from the document request.

FIG. 4 shows a query result browsing window 400, which is returned by document generator 2102. Query result browsing window 400 includes a list 407 of entries, where each entry includes a URL and a title. A user can select from list 407 URLs of their interest for storing as bookmarks in a browser or into WebDB 112. When the user clicks on the "Collect" button (401), a URL downloading procedure is triggered and all selected URLs are loaded into WebDB 112 via an incremental loader. When the user clicks on the "Save as Bookmark" button (402), a specified bookmark file is edited to include the bookmark thus created.

To manage the databases in WebDB 112, each database is associated with descriptive information, provided as "attributes." Examples of such attributes are shown in FIG. 5(a) (Table 1). These attributes are database meta-information, are thus to be distinguished from the document attributes discussed above. In particular, attributes "SubDBs" (501) and "SuperDBs" (502) are of significance, since these attributes provide a structure for forming a hierarchy of databases. Furthermore, the attribute "ACL" (access control list) 503 allows enforcement of access control, by specifying a list user identifiers representing those who are allowed access to the database. In addition, a number of attributes, e.g., "significant keywords" (504), are provided to provide additional search capability or to facilitate database administration.

As discussed above, WebDB 112 allow structuring databases as a directed acyclic graph, such as shown in FIG. 5(b). In FIG. 5(b), each terminal or leaf node (i.e., a node without an outgoing edge) represents a physical database (e.g., databases 510–514, labeled "P1", "P2", . . . , and "P5", respectively), and each non-terminal node (i.e., a node having an outgoing edge linking another node) represents a logical database (e.g., databases 516–518, labeled "X1", "X2", "Y1", and "Y2", respectively.) A logical database "N" is a union view built upon the "children" nodes to which N's edges are directed (i.e., $N=\bigcup_{(N, Ni) \in E} N_i$). A child node $N_i$ may itself be a logical database. A logical view is read-only.

While only the owners of a physical database can update a physical database, others may be allowed to access its contents. Thus, each physical database is associated with a user list, called an access control list or ACL, which lists the users who are allowed to query the database. For instance, in FIG. 5b, the physical database 510 is accessible to users "a", "b", and "c", and physical database 511 is accessible to users "a" and "b" only.

Access to any database in the hierarchy is regulated with respect to the ACLs of the leaf nodes. For example, consider the following query $Q_x$ issued by user "a" for logical database 515:

$Q_x$ = SELECT $D1.title$

FROM $X1$

WHERE $D1$ CONTAINS LINK $L1$

AND $D1$.keyword MENTIONS '$NEC$'

AND $L1.url = D2.url$

Because database 515 is a view (i.e., a logical database), the underlying databases 517 and 518, and 510–514 must be searched through a process of view expansion. Specifically, when database 515 is recursively expanded according to the union view definition, the physical components of database 515 is obtained as follows:

$X1 = Y1 \cup Y2 = (P1 \cup U2 \cup P3) \cup (P3 \cup P4 \cup P5)$ $= \bigcup \{P1, P2, P3, P4, P5\}$ However, since only those databases accessible to user "a" should be included (i.e., databases 510 and 511), logical database 518 need not be expanded. FIG. 6 provides an algorithm Vexp, which is a function for view expansion taking into consideration access control. Given a (logical or physical) database N and a user identification U, VExp(N, U) returns the set, without duplicates, of physical nodes reachable from N which are accessible by U. Algorithm VExp assumes that, for each node N, the system maintains two attributes "N.SubDBs" and "N.ACL". "N.SubDBs" is the set of children nodes connected from N (e.g., X1.SubDBs={Y1, Y2}). "N.ACL" is the user list of users granted access to a portion or the whole of N. When N is physical, "N.ACL" is the access control list assigned by the owner or owners of N. When "N" is logical, the system evaluates "N.ACL" as the union of its children node's ACLs (i.e., $N.ACL = \bigcup_{(N, Ni) \in E} N_i.ACL$.

Essentially, VExp recursively traverses all the nodes spanned from N. If any portion of N is accessible (as indicated by N.ACL), Vexp recursively calls itself on each child node, or returns the node if the current node N is physical. Otherwise, if N is not accessible to the user, then the algorithm simply returns an empty set, which effectively prunes the span of N. For example, the evaluation of Vexp (X1, a) is:

$VExp(X1, a) = Vexp(Y1, a) \cup VExp(Y2, a)$ $= (VExp(P1, a) \cup VExp(P2, a)) \cup \phi$ $= (\{P1\} \cup \{P2\}) \cup \phi$ $= \{P1, P2\}$ Therefore, the query $Q_x$ on the logical database 515 is evaluated on the union of the physical databases 510 and 512 because $X1=P1 \cup P2$.

Since a user query over a logical database can involve querying multiple (logical and physical) databases, query processing requires special handling. Many of the issues related to distributed query processing become pertinent in this context. In principle, a query involving the union of multiple physical databases (e.g., $Q_p$) can be readily evaluated if the databases (e.g., databases 510 and 511) reside in the same DBMS. However, in some situations, additional processing that coordinates separate results from the databases, for example:

1. When databases 510 and 511 are physically distributed, as is the case in a distributed database system, or
2. when certain join conditions are optimized for evaluation within a single database (i.e., self-join, such as P1 $\oplus_j$ P1, where $\oplus_j$ is the join operator with J as a join comparison condition) and thus complication arises when the same join involves multiple databases (e.g., P1 $\oplus_j$ P2).

In particular, WebDB 112 optimizes the evaluation of join conditions on document links with pre-computed object pointers: when HTML documents are manifested as objects in a database, the links are stored as pointers between the corresponding objects. For example, the join condition "D1 CONTAINS LINK L1 AND L1.url=D2.url" can be evaluated simply by following the pointers from objects D1 to find those objects D2 in the database. This optimization based on modeling links as object pointers is of significance for a Web database. The advantages of object-oriented DBMS facilitate query processing for joins on links and make efficient navigation possible. However, because object pointers do not cross database boundaries, while documents within these database may actually link each other, additional processing to find those "cross-database" results are required.

Figure 7:
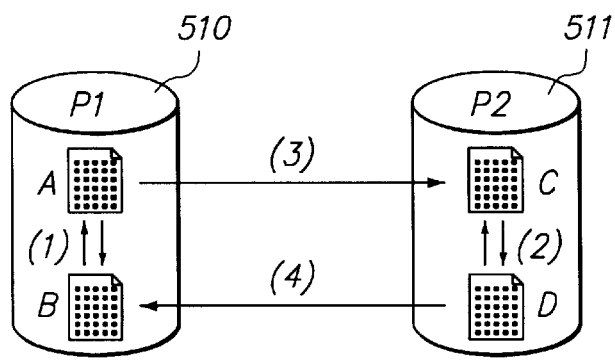
FIG. 7 shows a conceptual illustration of document links (represented by arrows) within and across database boundaries within WebDB 112.

FIG. 7 shows a conceptual illustration of document links (represented by arrows) within and across database boundaries. As shown in FIG. 7, four types of linkages between two documents D1 and D2 are possible:

(1) both documents (e.g., documents "A" and "B") reside in database 510 (labeled "P1"), (2) both documents (e.g., documents "C" and "D")reside in database 511 (labeled "P2"), (3) D1 resides in database 510 and D2 resides in database 511 (e.g., documents "A" and "C"), or (4) D1 resides in database 511 and D2 resides in database 510 (e.g., documents "D" and "B").

More formally, query $Q_x$ discussed above can be expressed in relational algebra as follows:

$$\sigma_{C(D1)}(X1) \oplus_{j(D1,D2)} \sigma_{C(D2)}(X1)$$

Thus, in query $Q_x$, there are two document variables D1 and D2. Algebraically, a subset of X1 is first selected which satisfies the conditions on D1 (i.e., C(D1)=D1.keyword MENTIONS 'NEC') and D2 (i.e., C(D2)=null). The join condition J(D1, D2) is then evaluated on links for any pairs of D1 and D2. For example, J(D1, D2) can be "D1 CONTAINS LINK L1 AND L1.url=D2.url".

Since X1 represents P1∪P2 for user a, the algebra expression thus becomes:

$$\sigma_{C(D1)}(P1 \cup P2) \oplus_{j(D1,D2)} \sigma_{C(D2)}(P1 \cup P2)$$

$$= \bigcup \{\sigma_{C(D1)}(P1) \oplus_{j(D1,D2)} \sigma_{C(D2)}(P1), \quad (1)$$

$$\sigma_{C(D1)}(P2) \oplus_{j(D1,D2)} \sigma_{C(D2)}(P2) \quad (2)$$

$$\sigma_{C(D1)}(P1) \oplus_{j(D1,D2)} \sigma_{C(D2)}(P2) \quad (3)$$

$$\sigma_{C(D1)}(P2) \oplus_{j(D1,D2)} \sigma_{C(D2)}(P1)\} \quad (4)$$

Sub-queries (1)–(4) correspond to the four types of document links in FIG. 7. Among the sub-queries, (1) and (2) can be readily evaluated using pointer traversal, since only a single database is involved. To process sub-queries (3) and (4), when $\oplus_{j(D1, D2)}$ is a link condition, ordinary join evaluation, rather than optimized pointer traversal is required.

The sub-queries necessary to evaluate a query Q as "SELECT FROM R WHERE W", which searches (logical or physical) database R with conditions W (an arbitrary Boolean combination of predicates) are provided thus as follows:

(a) Suppose the WHERE clause W contains n document variables: $D_1, D_2, \ldots, D_n$. Q can then be expressed in algebra as:

$$Q = \sigma W_d(R_1 \times R2 \times \ldots \times Rn)$$

where $R_i$ simply designates the i-th occurrence of R (i.e., $R_i = R$) representing the domain of $D_i$.

(b) W can be expressed in a DNF (disjunctive normal form) as m disjuncts: $W_d = \vee \{w_1, w_2 \ldots, w_m\}$. Since each disjunct $w_i$ is a conjunction of predicates, Q can be written as:

$$Q = \sigma W_d(R_1 \times R_2 \times \ldots \times R_n)$$

$$= \bigcup_i \sigma W_i(R_1 \times R_2 \times \ldots \times R_n); \text{ where } i \text{ runs from } i \text{ to } m.$$

(c) Applying Algorithm Vexp to expand R for user U, assuming VExp (R, U)={$B_1, B_2, \ldots, B_k$}, substituting $B_1 \cup B_2 \cup \ldots B_k$ for each $R_i$, Q becomes $$Q = \bigcup_i \sigma W_i\{(B_1 \cup B_2 \cup \ldots \cup B_k) \times (B_1 \cup B_2 \cup \ldots \cup B_k) \ldots \times$$

$$(B_1 \cup B_2 \cup \ldots \cup B_k)\}$$

$$= \bigcup_i \bigcup (\{\sigma W_i[(B_{l1} \times B_{l2} \times \ldots \times B_{ln}] \mid lj \in [1:k]\})$$

(d) Let $C_i(D_j)$ be the selection condition from $w_i$ for variable $D_j$, and let $w_i'$ be the join conditions in $w_i$ (i.e., those predicates involving two variables). Q becomes Eq.(5):

$$Q = \bigcup_i \bigcup (\{\sigma w_i'[(\sigma C_i(D_1)B_{l1}) \times (\sigma(C_iD_2)B_{l2}) \times \ldots \times (\sigma C_i(D_n)B_{ln})] \mid lj \in [1:k]\})$$

which gives the sub-queries we need to evaluate the query Q, each sub-query taking the form:

$$q = \sigma w_i'[(\sigma C_i(D_1)B_{l1}) \times (\sigma(C_iD_2)B_{l2}) \times \ldots \times (\sigma C_i(D_n)B_{ln})]$$

Based on the algebraic expression, the query processing steps can be summarized as:

(a) For each sub-query of the form $q = \sigma w_i'$ [$(\sigma C_i (D_1) B_{l1}) \times (\sigma(C_i D_2) B_{l2}) \times \ldots \times (\sigma C_i (D_n) B_{ln})$], if all lj's are the same (i.e., q involves a single database), then process q using pointer traversal. Otherwise, i.e., there are multiple databases involved, q is processed by:

(I) evaluating each $\sigma C_i(D_j)B_{lj}$ (i.e., selecting from $B_{lj}$ those objects satisfying $C_i(D_j)$) and then (II) evaluating the join condition $w_i'$ on the results.

(b) Union the results of all the sub-queries.

The processing, as outlined above, requires $k^n$ sub-queries to be evaluated, where k and n are respectively the number of physical databases and document variables. In other words, the processing is exponential in the "length" of the join chain.

For small queries (where n is small) and small number of physical databases involved, the processing cost can remain reasonable. In fact, users typically issue small queries. Moreover, this approach optimizes the typical case, in which only link queries within a single physical database are involved.

Alternative processing strategies are desirable when expensive queries are involved. Examples of the available options include:

(a) centralizing all the documents in a single (physical) database;

(b) to facilitate join processing, partially "materializing" the logical views;

(c) rather than using optimized pointer traversal for link conditions, evaluating link conditions with joins supported by the underlying database engines.

Partial materializing can be achieved, for example, by storing "cross-pointers" between component databases.

Figure 8:
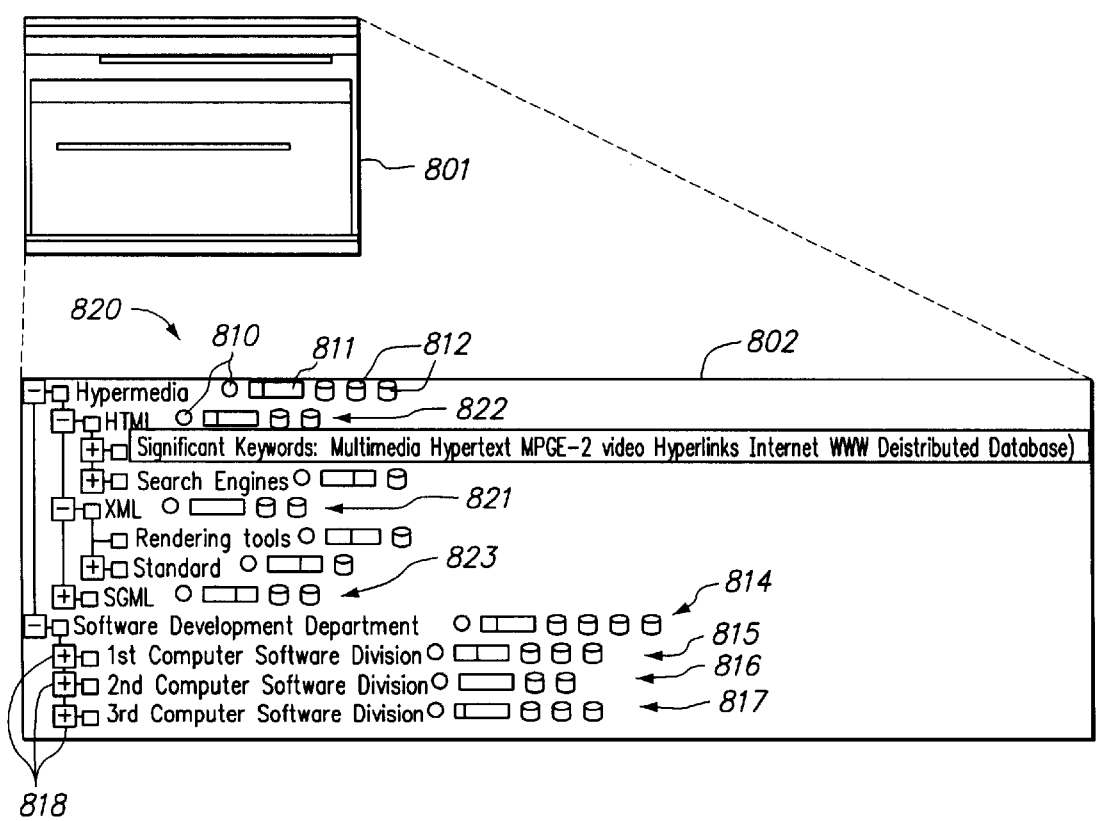
FIG. 8 shows a database selection and navigation interface of the present invention, called "Database Viewer".

As discussed above, WebDB provides a database selection and navigation interface, called "Database Viewer", which is illustrated by FIG. 8. Examples of forms from the Database Viewer have been shown in FIG. 1 as forms 117 and 118. In FIG. 8, a portion of an image 801 is enlarged as image 802. The Database Viewer visualizes the database summary metadata with icons. For instance, a "circle" icon (810) with different colors to visualize the average freshness of a database. The "temperature scale" icon (811) for each entry indicates how actively a particular database is being accessed. Similarly, a set of "disk" icons (812) represents the relative size of the database. In addition to these visual representations, the Database Viewer shows the actual values of the aggregate information when a user selects a particular database.

In image 802 of FIG. 8, the Database Viewer shows that the "Software Development Department" database (814) consists of three document databases 815–817. Document databases 815–817 are logical databases since there is a "plus" icon (818) associated with each database indicating component databases. Users of WebDB 112 can create a "semantic view," which is a logical database whose contents are specified using keywords. For example, a user may specify a "Hypermedia" semantic view (820) by specifying that its contents are to consist of documents having keywords "XML" (821), "HTML" (822), "SGML" (823) and "Software Development Department" (814) as shown in FIG. 8. Alternatively, in addition to the keyword vector model (i.e., specifying the semantic view using keywords), semantic views can also be created using natural language processing techniques.

The process for creating and maintaining a semantic view in WebDB is next described. Semantics views can be created as one "browses" through the content of document databases based on some specific topic (e.g., document databases related to the topic "XML"). Alternatively, these semantic views can be used as a way to categorize and classify information contained in WebDB 112 (e.g., a database contains all documents related to "XML"). To support these two kinds of semantic views, semantic views in WebDB 112 are provided in various levels of detail: between the physical document database level and the individual documents. At a finer granularity, a semantic view can be defined as a collection of related documents from any databases. Alternatively, a user may specify a semantic view as a collection of related databases. The granularity of a semantic view is specified at the time of creation. Table 2 shows the attributes used for maintaining semantic views.

As shown in FIG. 5(c) (Table 2), in addition to a database's attributes disclosed in FIG. 5(a) (i.e., Table 1) above, two additional attributes 541 and 542 are specifically provided to maintain a semantic view. The attribute "Semantic Definition" (541) is a set of keywords, specified at the time of creation, which define the semantic view. In this embodiment, two levels of semantic granularity are provided. Therefore, the attribute "Semantic Detail" (542) is a flag indicating if the view is maintained at the physical database level or at the document level. The association between a semantic view and a physical database at the coarse level is established on the basis of the "significant keywords" attribute (504) of the physical database. Significant keywords are maintained as metadata for efficient browsing of document databases. To support such browsing, a mapping is maintained to relate a specified keyword w to a set of physical databases $P_i$ that have w in their list of significant keywords. Such a mapping establishes the association between a semantic view and the document databases on which the view is based. Thus, when a user creates a semantic view S at the database level with a semantic definition that include keyword w, the significant keyword index is used to identify all physical databases $P_i$ to be include in the semantic view S's attribute S.SubDBs. Simultaneously, S is added to each $P_i$'s attribute $P_i$.SubDBs. To avoid including databases having only an insignificant number of relevant documents, a user can specify a threshold. Databases having a lesser number of relevant documents than the threshold are excluded from the semantic view.

Figure 9A:
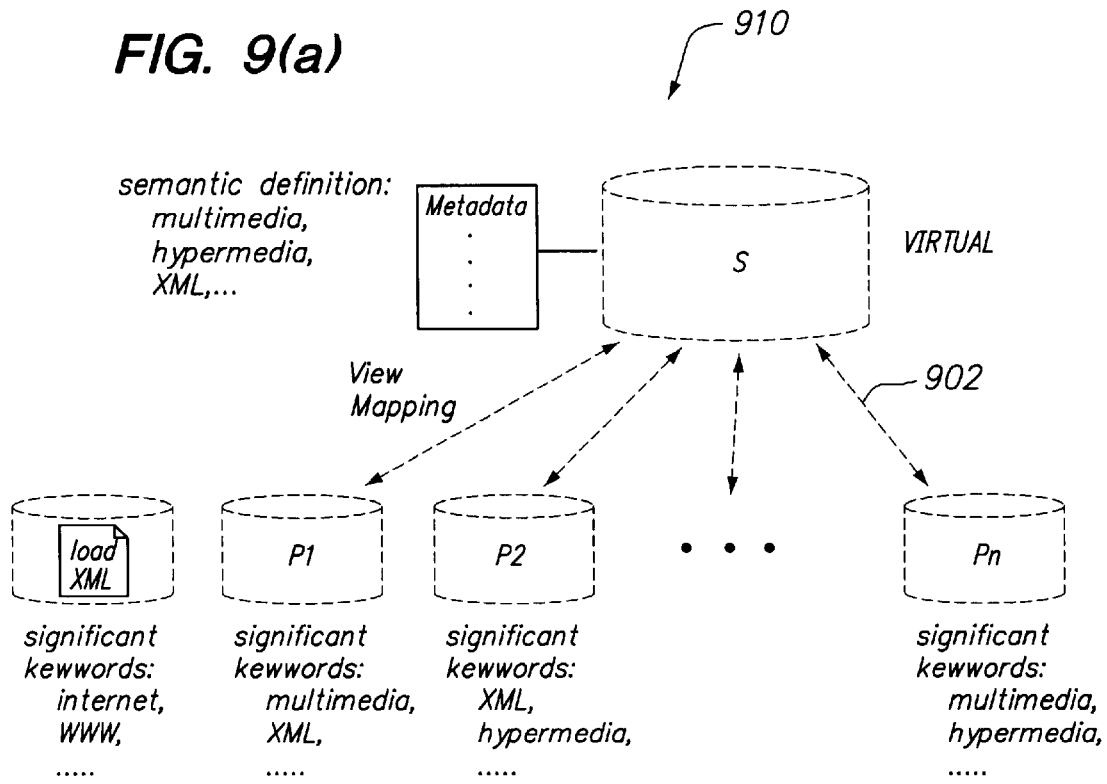
FIGS. 9(a)–9(c) show three implementations 910, 911 and 912 of a semantic views, defined respectively by keywords "multimedia," "hypermedia," "XML".
Figure 9B:
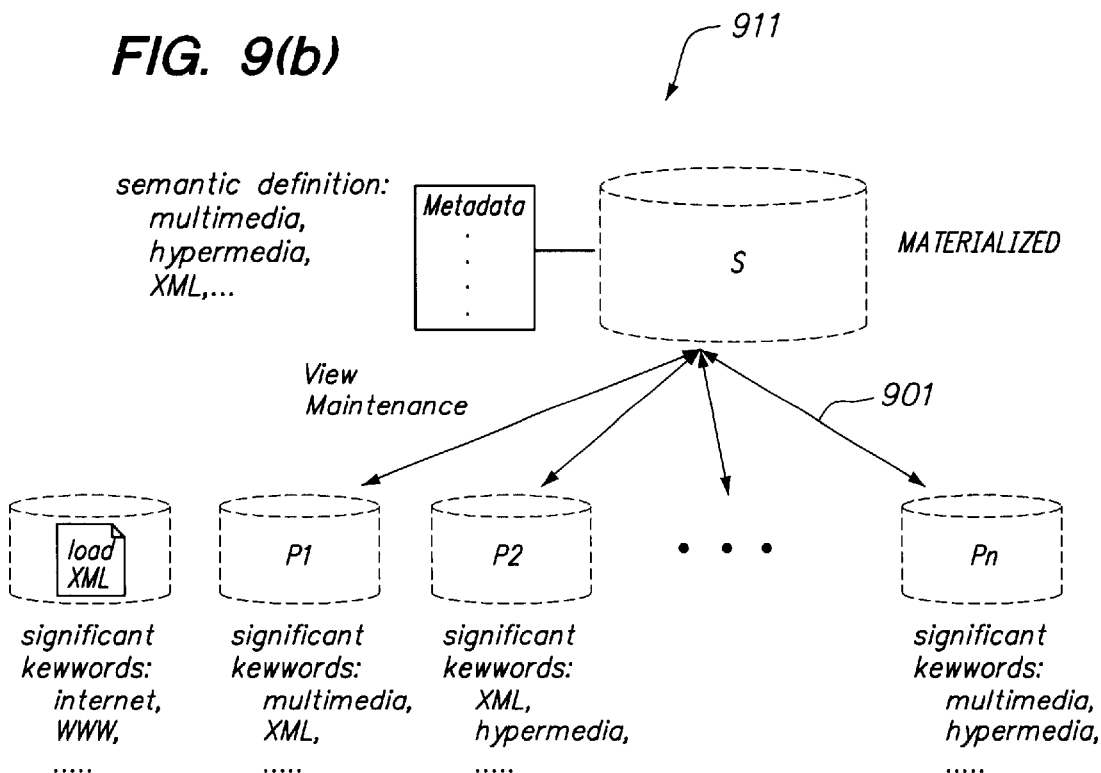
Figures 9C, 10:
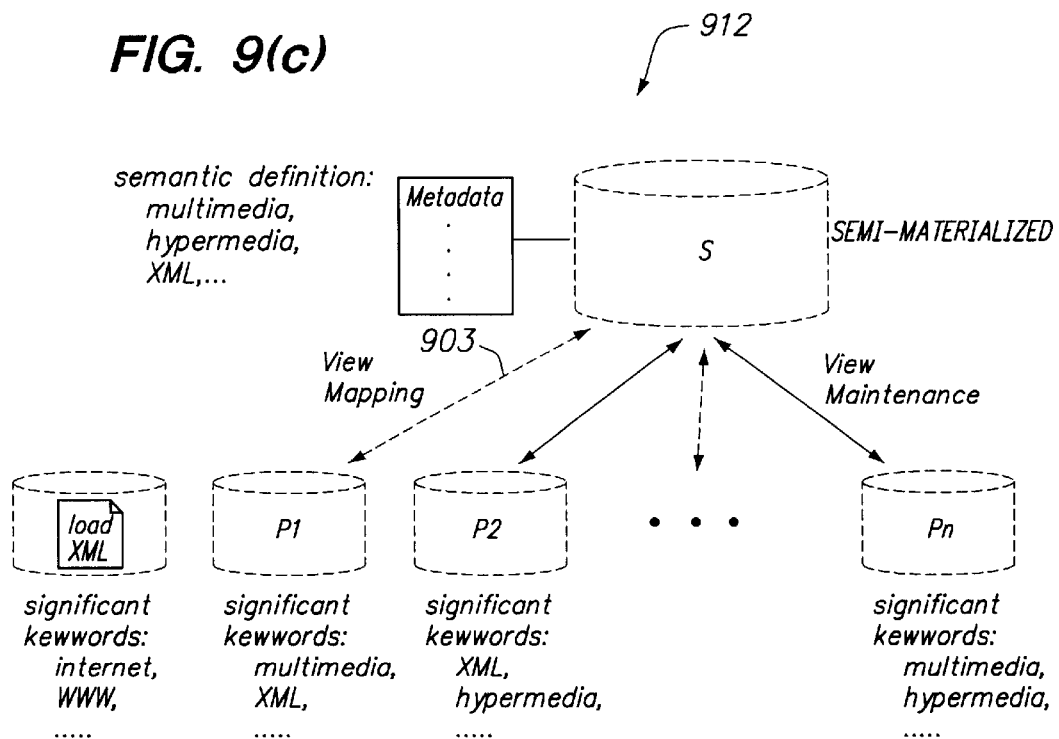
FIG. 10 shows an algorithm for creating a database level semantic view S.

FIGS. 9(a)–9(c) show three implementations 910, 911 and 912 of a semantic view defined by keywords "multimedia," "hypermedia," "XML". In each of FIGS. 9(a)–9(c), a solid line denotes a "materialization relationship" (e.g., line 901) and a dotted line denotes a "non-materialization relationship" or a "physical/logical database relationship." (902) FIG. 9(a) shows implementation 910, which is a virtual semantic view, FIG. 9(b) shows implementation 911, which is a materialized semantic view, and FIG. 9(c) shows implementation 912, which is a semi-materialized semantic view where the contents of the database view are not fully materialized.

Semantic views differ from a conventional logical database in one aspect. In a conventional logical database, the sub-databases are statically defined. For example, if a logical database L is defined by sub-databases a, b, and c, the parent-child database relationship with each sub-database is fixed. Any modification is achieved only by the database administrator. In a semantic view, however, the parent-child relationship between a semantic view S and databases $P_1$, $P_2$, ..., $P_n$ is dynamic, (i.e., the parent-child relationship changes as the underlying physical databases are updated). Furthermore, if semantic view S is materialized (completely or partially), view maintenance operations are carried out. To maintain a dynamic mapping between a semantic view and its constituents, a data structure referred to as the "semantic view definition index" is maintained. The semantic view definition index maps a given keyword w to a set of semantic views S which semantic definitions include w.

FIG. 10 shows an algorithm for creating a database level semantic view S. The significant keyword index identifies all physical databases $P_i$'s that are relevant to the semantic definition of semantic view S. The parent-child relationship between the physical databases $P_i$'s and semantic view S is established by updating the metadata attributes S.SubDBs and $P_i$.SupDBs. A function called "materialize" determines if the documents contained in a database $P_i$ need to be materialized (i.e., included) at semantic view S. If function "materialize" returns a true value, the documents from $P_i$ are materialized in semantic view S.

FIG. 11 shows an algorithm for maintaining a view mapping for a virtual semantic view. When a document d is inserted into or deleted from a document database $P_i$, the metadata attribute $P_i$.SignificantKeyword may be updated. This update may result in deletion of certain keywords from the $P_i$.SignificantKeyword attribute, as denoted by the "DeletedWords" list in FIG. 11. Alternatively, some words may be inserted into the $P_i$.SignificantKeyword attribute, as denoted as by the "InsertedWords" list in FIG. 11. The semantic definition index identifies semantic views S affected by the words in "DeletedWords". Since deleted keywords are no longer part of $P_i$, the parent-child relationship between all such semantic views S and database $P_i$ is severed. Furthermore, if a semantic view in semantic views S materializes database $P_i$, then the documents in $P_i$ (excluding document d) are deleted from semantic view S.

For semantic views S affected by an "InsertedWords" list, a parent-child relationship is between each of semantic views S and database $P_i$ is established, if necessary. Then the documents of $P_i$ (excluding document d) in each of semantic views S are materialized if necessary. Finally, for each semantic view S which materializes database $P_i$, document d is inserted or deleted from semantic view S as appropriate.

Query processing for virtual, materialized, or semi-materialized semantic views are different. When a user issues a query over a virtual semantic view S, the S.SubDBs attribute is used to propagate the query to appropriate physical databases. If semantic view S is materialized, however, the query is processed against the data contained in semantic view S. Finally, if semantic view S is semi-materialized, the query is processed as follows. Materialized content of a semantic view S is treated as a special leaf-level node that is included in the view expansion for query processing. Thus, queries can be processed in the same manner as was described above. Access control is enforced in a similar manner as described above.

Figures 12, 13A:
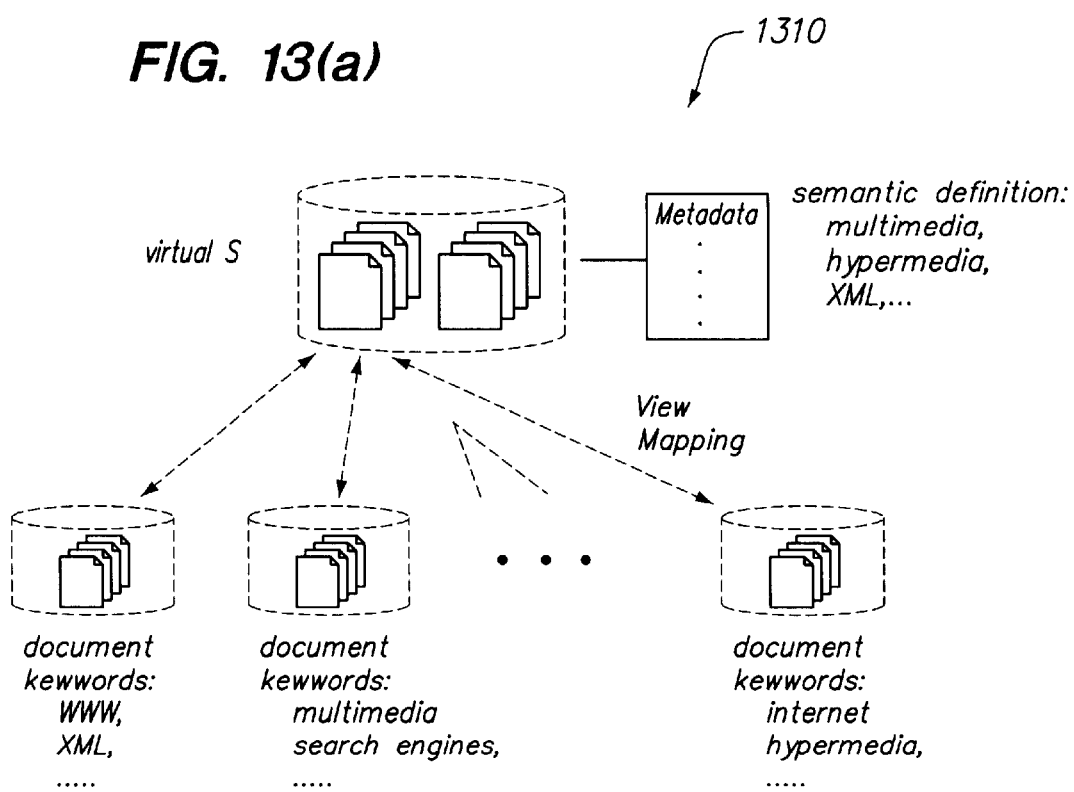
FIG. 12 shows an algorithm used to create a document based semantic view.
FIGS. 13(a)–13(c), show three implementations 1310, 1311 and 1312 of a semantic view S.

Creation and maintenance of a semantic view defined at the individual document level are more complex. To create such a semantic view that includes a documents in a database $P_i$, each document in a database $P_i$ is queried as to its relevance to semantic view S. FIG. 12 shows an algorithm used to create a document based semantic view. The algorithm scans each document database $P_i$ and determines if database $P_i$ has any documents relevant to semantic view S. If such a document is found, then a parent-child relationship between database $P_i$ and semantic view S is established. Furthermore, if semantic view S need to be materialized, the documents of database $P_i$ responsive to the query (i.e., relevant documents) are added to semantic view S. Of course, according to the algorithm of FIG. 12, since potentially every document database in every database of WebDB 112 is queried, the execution time can be substantial. An alternative approach is to use a heuristic approximation which scans only those databases $P_i$ having a $P_i$.Significant-Keyword attribute that overlaps with the S.SemanticDefinition attribute of the proposed semantic view S.

Figure 13B:
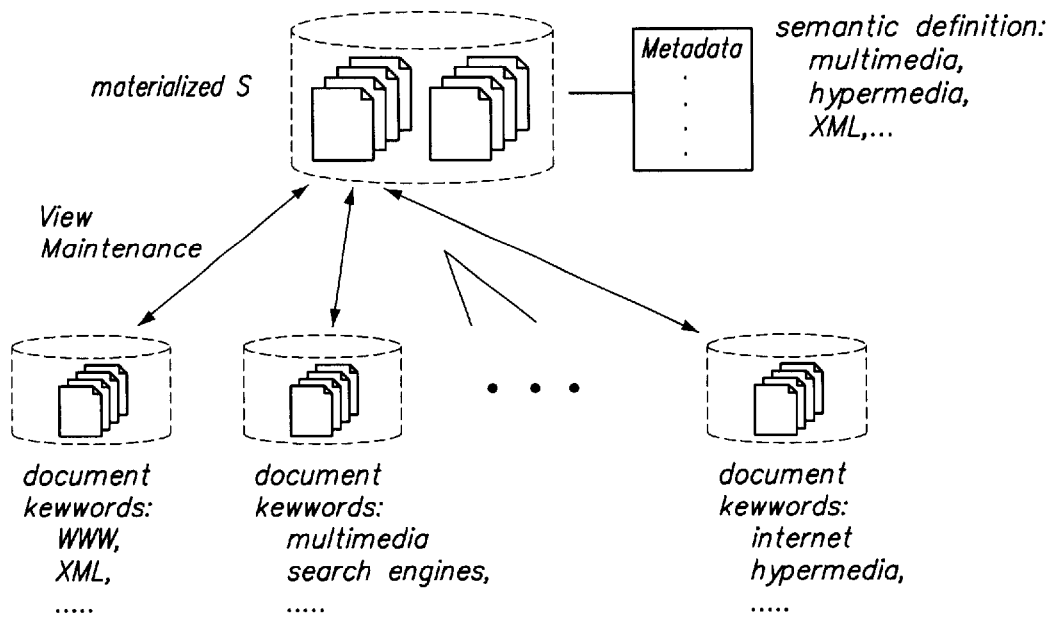
Figure 13C:
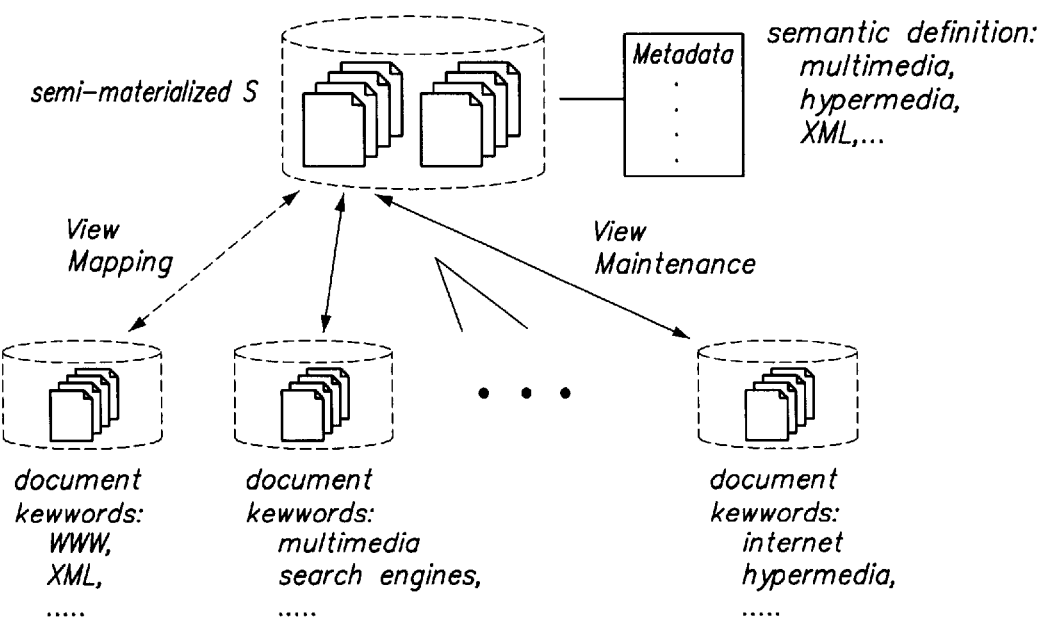

FIGS. 13(a)–13(c), show three implementations 1310, 1311 and 1312 of a semantic view S. As shown in FIGS. 13(a)–13(c), a semantic view S can be created as completely virtual, completely materialized, or semi-materialized, respectively. For a document level semantic view, all documents matching the semantic definition are copied into the semantic view. Because a document in the semantic view may be collected from different document databases, some attributes (such as "remarks") of the document are created from the conjunction of attribute values in the different source copies of the document. (The "remarks" attribute allows a user to include annotations or comments with a document; such annotations or comments are useful for collaborative social filtering functions). For example, as shown in the user interface "Document Level Semantic View Browsing Interface" (1400) of FIG. 14, a user can peruse the comments (1402) and source (1403) descriptions for a document. The user interface of FIG. 14 also allows a user to specify a refresh frequency (1401) for each document (e.g., weekly).

Whenever a document is inserted into or removed from a document database, the semantic view maintenance algorithm of FIG. 15 can be invoked. In the algorithm of FIG. 15, the semantic views S affected by document d to be inserted or deleted are identified using the semantic definition index. To insert document d, the parent-child relationship between each of semantic views S and a database $P_i$ is established and document d is materialized in the appropriate ones of semantic views S, if necessary. For a document d deleted from database $P_i$, if document d is materialized in semantic view S, document d is also deleted from semantic view S. Then, database $P_i$ is checked to determine if the database still contain any document relevant to semantic view S after the deletion of document d. If there are no such document, the parent-child relationship between database $P_i$ and semantic view S is severed. Of course, other approaches for maintaining semantic views are possible. For example, instead of using "eager" maintenance, which incur a high update cost, the maintenance can be carried out "lazily". The relative merits of these approaches depend upon the number of databases and their sizes. Query processing and access control are carried out as described above.

FIG. 16(a) illustrates a semantic hierarchy in which a virtual semantic view 1600 (labeled "Hypermedia") is organized in terms of other semantic views 1601 ("WWW"), 1602 ("XML"), 1603 ("VOD") ... 1609 ("DVD"). FIG. 16(b) is a view of the semantic hierarchy of FIG. 16(a) from a query processing point of view. As shown in FIG. 16(a), a second level semantic view can be based on a physical document database (e.g., database 1603) or other semantic views (e.g., semantic views 1601 and 1602). To support arbitrary semantic hierarchy, automated view creation and view maintenance support for semantic views are defined based on physical document databases. Semantic views that are defined over other semantic views fall into the domain of "semantic classification" and are created and maintained under explicit user direction.

Conventional logical databases can be combined with semantic views. For example, the database hierarchy shown in FIG. 16(a) can be viewed as follows: at the root of the hierarchy is a logical database 1600 for the "Hypermedia" project, consisting of semantic views (e.g., semantic views 1601 and 1609), logical or virtual databases (e.g., database 1602), and physical document databases (e.g., database 1603). As long as the semantic views used in the mix database hierarchy have a depth of one, the mixing of semantic views with conventional logical databases does not give rise to any complexity for query processing and access control. In particular, the query processing and view expansion scheme described above can be applied to a mix hierarchy of databases. (For each semantic view, a special child node is assumed at the leaf level which contains the materialized data.)

For a query upon the "hypermedia" database 1600, as shown in FIG. 16(b), the query processor expands only semantic views 1602 ("XML") and 1609 ("DVD") in the manner described above, since all other children nodes are either physical databases or materialized logical databases. In this embodiment, the database management system manages retrieval and materialization. Physical database 1603 ("VOD") and materialized database 1601 ("WWW") do not require expansion. In summary, although there are different types of databases, the query processor can treat each type of database uniformly by expanding non-materialized and non-physical databases to a set of physical and materialized nodes, to which the query processing techniques discussed above are applicable.

WebDB 112 promotes information organization, sharing and management by providing a "subscription-notification service" by which a user can access "critical" information on an incremental basis. A users can organize a repository in a "temporal" dimension according to the creation or last modification date of a document. Sharing of information is facilitated by automatic user notification of information update in a particular domain of interest. In this embodiment, a user is allowed to view the new information based on the values a variety of attributes. In contrast to the "pull" model, where users actively seek information, the subscription-notification service operates in "push" model, which offloads the task of updating information to an automated process.

Figure 17A:
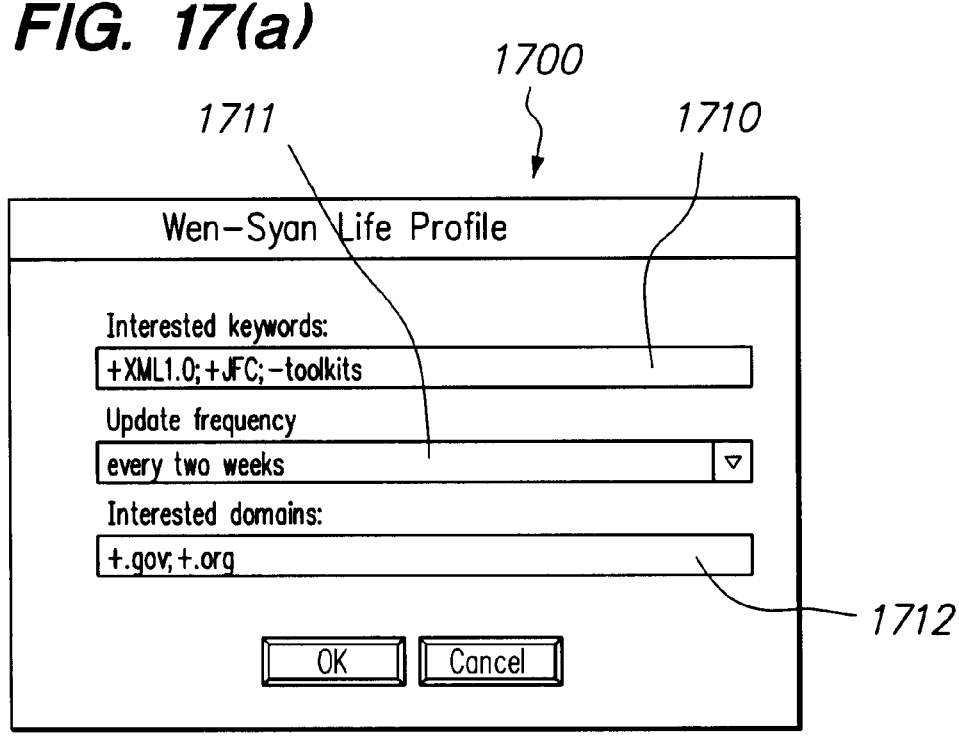
FIGS. 17(a) and 17(b) are screen images 1700 and 1701 of user interfaces for specifying a subscription query of interest for the Internet and for an intranet, respectively.
Figure 17B:
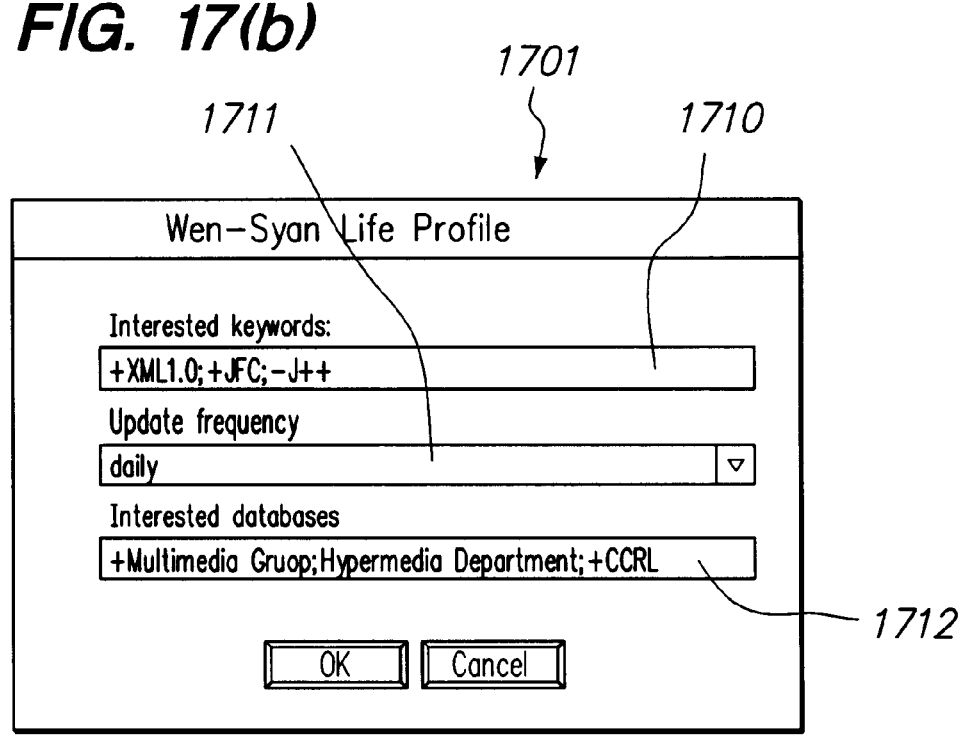

As documents are distributed across both the Internet and intranets, WebDB 112 provides separate subscription-notification services for the Internet and intranets documents separately. FIGS. 17(*a*) and 17(*b*) are screen images 1700 and 1701 of user interfaces for specifying a subscription query of interest for the Internet and for an intranet, respectively. In image 1700 of FIG. 17(*a*), the user specifies as "interested keywords" (1710) documents related to "XML.1.0" and "JFC" but excludes "tool kits". Since update frequency (1711) is set to "two weeks", the returned documents are created or modified within the last two weeks. In addition, the user also specifies under "interested domains" (1712) documents in the ".gov" and ".org" domains. With this specification, a query is dispatched to retrieve from domains ".gov" and ".org" documents which are introduced to the Web or updated within the past two weeks pertaining to "XML.1.0" and "JFC", but not those pertaining to "toolkits".

FIG. 17(*b*) shows image 1701 of a user interface by which the user can specify a subscription to a specific set of physical document databases in WebDB 112, in substantially the same manner as described with respect to image 1700 of FIG. 17(*a*).

Figure 18:
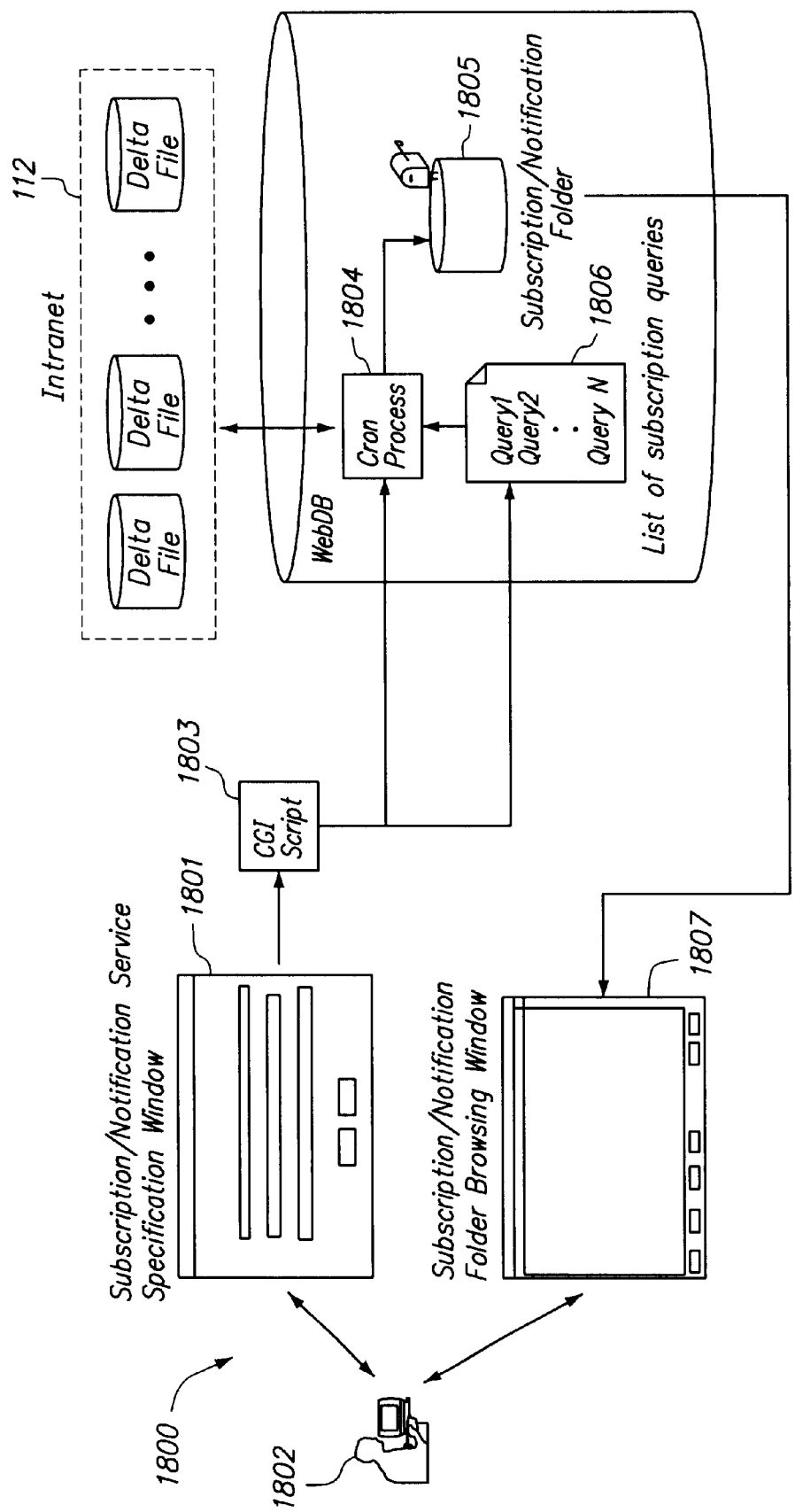
FIG. 18 illustrates an implementation 1800 in WebDB 112 for subscribing to information residing an intranet

FIG. 18 illustrates an implementation in WebDB 112 for information push on an intranet. In this instance, a user specifies 1802 specifies through image 1801 of an interface a subscription by a set of keywords, an update frequency, and the domains in which the particular information resides, substantially in the same manner described above with respect to FIGS. 17(*a*) and 17(*b*). The set of keywords can be specified either manually or by reference (link) to the significant keyword attributes of the user's database. The update frequency can be either "immediate" or "periodic". If the frequency is specified to be periodic, the user further specifies a time period (e.g., daily, weekly, etc.) After the user sets up the subscription profile and submits it to the system, the underlying system (in this instance, CGI script 1803) creates two entities: a subscription-notification folder (1805) and a subscription-notification process (1804). The subscription-notification service determines the current status of a document by examining its metadata attribute "Last Refreshed Date" (attribute 204 in FIG. 2). At the time of creation, subscription-notification process 1804 executes one or more WQL queries (1806) on the specified physical document databases to collect all the relevant documents in the subscription-notification folder 1805. After the folder is created, subscription-notification process 1804 is invoked according to the update frequency. If the update frequency is set to "immediate", the process is activated whenever new documents are inserted into WebDB 112 by the incremental loader. Otherwise, i.e., if the update frequency is set to "periodic", the process is activated by a timer interrupt. The timer interrupt is generated when the "Document.LastRefreshedDate" attribute of the document exceeds the time subscription-notification process 1804 was last activated. Thus, subscription-notification process 1804 retrieves all documents that are refreshed or loaded into WebDB 112 since the prior notification. The newly added information to the document databases can be maintained in "delta files" for efficient incremental processing of a subscription-notification query.

After subscription-notification process 1804 updates subscription and notification folder 1805 with the newly retrieved information, the user is notified by a display window (1807) containing the new document level information. An image 1900 of the display window is shown in FIG. 19. Image 1900 of FIG. 19 is similar to image 400 of FIG. 4 except that image 1900 provides additional temporal information, such as the times at which the listed documents are introduced to the Internet (i.e., field 1901, labeled "Date") and whether such documents are new documents or modified documents (i.e., field 1902, labeled "Type"). Image 1900 of the display window in this FIG. 19 is similar to an email viewing window. In addition to "slide-show-like" presentation of all or some selected pages, a user can delete an entry or collect an entry into the user's database, as discussed above with respect to image 400 of FIG. 4. In addition, each entry is associated with status information indicating the most recent time the document was referenced. WebDB 112 processes the status information before updating the display. For example, if a document appeared at the displayed list at some time t, but is not deleted, collected or viewed during the next update period, the system replaces the document at time t+δt if it is modified during this interval. Otherwise, the new document description is appended to the current displayed list.

Figure 20:
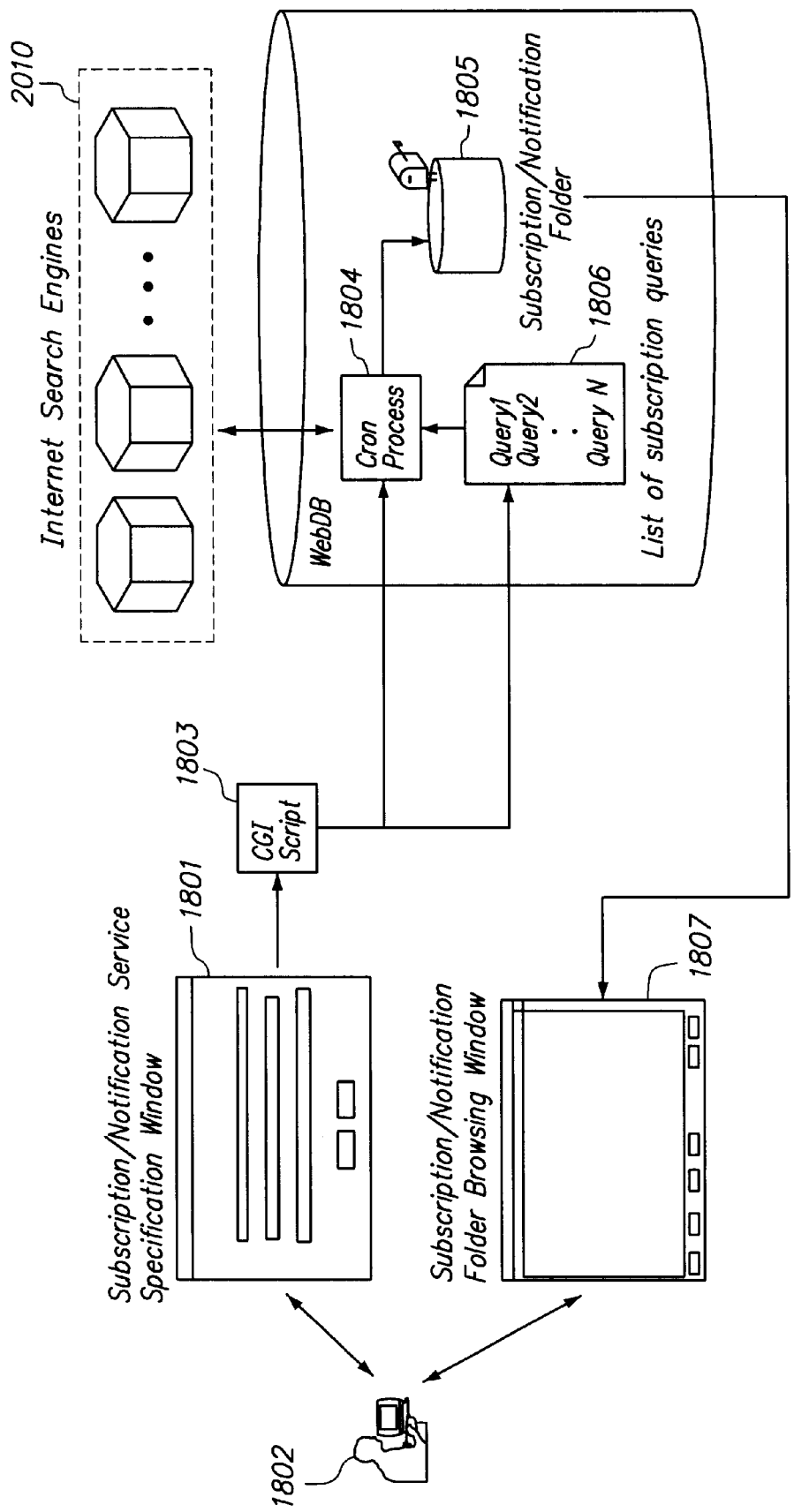
FIG. 20 illustrates an implementation 200 in document management system 100 for subscribing to Internet documents.

FIG. 20 illustrates a subscription-notification service 2000 for internet documents. As shown in FIG. 20, a user specifies a subscription substantially the same as described above with respect to process 1800 of FIG. 18, except that the user specifies the names of Internet search engines 2010 as information source. To facilitate comparison, like elements of subscription-notification services 1800 and 2000 are given like reference numerals. To efficiently support a subscription-notification at the Internet search engine level, a search engine application program interface (API) that allows incremental searches, such as that provided by the search engine "HotBot" can be used. Such an interface allows a user to query new documents that are indexed during the most recent update (e.g., two weeks) window.

A user can create a subscription-notification service by creating a process and a folder. The process dispatches the search request to the specified search engines to retrieve the relevant documents from the Internet. These documents are then stored in the folder. Subsequently, the subscription-notification process is activated at specified intervals to dispatch search requests for updates to the documents indexed by the search engine since the previous notification. WebDB integrates the complete list of URLs that match the incremental subscription-notification query into a subscription-notification folder. The folder is then presented to the user in the document display window of FIG. 20. The user may view, browse or insert candidate URLs into the database, as discussed above.

The detailed description above is provided to illustrate the specific embodiments of the present invention and is not intended to be limiting. Numerous modifications and variations within the scope of the present invention are possible. The present invention is defined by the appended claims.

I claim:

1. A document management system comprising:
   a document database including documents collected from a plurality of sources of a computer network, wherein said document database is organized as a hierarchy of component databases, wherein each of said component databases has associated with it meta-information describing said hierarchy, and wherein said meta-information includes an access control list associated with each component database;
   a user interface for receiving database queries; and a database management system administering said database, said database management system including a query processor for processing said queries to retrieve documents from said database and from said sources of a computer network, wherein the access control lists for each component database are combined without duplication into a combined access control list, and wherein said query processor accesses a component database only after verifying permission to access against said combined access control list.

2. A document management system as in claim 1, wherein said database management system provides a subscription service which notifies users of updates to documents collected in said logical document database and selected documents in said computer network, when a predetermined criterion is satisfied.

3. A document management system as in claim 2, wherein said subscription service comprises:
   a process for retrieving new or updated documents responsive to a query when a predetermined condition is satisfied; and
   a repository for including said new or updated documents.

4. A document management system as in claim 3, wherein said predetermined condition comprises the lapse of a predetermined time interval.

5. A document, management system as in claim 3, wherein said process retrieves said new or updated documents over said computer network.

6. A document management system as in claim 3, wherein said process retrieves from said logical document database said new or updated documents.

7. A document management system as in claim 1, wherein each document of said logical document database is associated with meta-information, said meta-information associating (a) each document with objects within said document and (b) each document with other documents of said logical document database.

8. A document management system as in claim 1, wherein one of said component databases comprises documents specified by a semantic definition.

9. A document management system as in claim 8, wherein said semantic definition includes one or more keywords found in documents within said component database.

10. A document management system as in claim 8, wherein said query processor retrievals documents based on natural language processing rules.

11. A document management system as in claim 1, wherein said component databases include logical databases.

12. A document management system as in claim 1, wherein a selected one of said component databases is defined by a union of a plurality of databases, including a logical database.

13. A document management system as in claim 12, wherein said selected one of said component databases comprises a virtual database.

14. A document management system as in claim 12, wherein said selected one of said component databases comprises a materialized database.

15. A document management system as in claim 12, wherein said selected one of said component databases comprises both a materialized database and a virtual database.

16. A document management system as in claim 12, wherein said logical database is associated with one or more keywords of documents within said logical database.

17. A document management system as in claim 12, wherein said logical database comprise a collection of documents.

18. A document management system as in claim 17, wherein said collection of documents include virtual documents.

19. A document management system as in claim 17, wherein said collection of documents include materialized documents.

20. A document management system as in claim 17, wherein said collection of documents include semi-materialized documents.

21. A document management system as in claim 17, wherein documents responsive to a query arc retrieved dynamically.

22. A document management as in claim 1, wherein said query processor expands a virtual component database to process a query against said virtual database, and process said query against documents included in a materialized component database without expansion.

23. A document management system as in claim 1, further comprising a graphical user interface for composing queries to said query processor.

24. A document management system as in claim 1, wherein said query processor further comprises a document generator for returning information retrieved in response to a query in a predetermined format.

25. A document management system as in claim 24, wherein said predetermined format comprises hypertext.

26. A document management system as in claim 24, wherein said database management system comprises a physical level database management system and a logical level database management system.

27. A document management as in claim 26, wherein said query processor comprises a logical level query processor associated with said logical level database management system and a physical level query processor associated with said physical level database management system, and wherein a query received into said document management system is translated by said logical level query processor into physical level queries for processing by said physical level query processor.

28. A document management system as in claim 1, wherein said user interface provides a graphical user interface to allow viewing the organization of said document management system.

29. A method for providing a document management system, comprising:
   organizing a document database, said document database including documents collected from a plurality of sources of a computer network, wherein said document database is organized as a hierarchy of component databases, wherein each of said component databases has associated with it meta-information describing said hierarchy, and wherein said meta-information includes an access control list associated with each component database;
   providing a user interface for receiving database queries; and
   providing a database management system administering said database, said database management system including a query processor for processing said queries to retrieve documents from said database and from said sources of a computer network, wherein the access control lists for each component database are combined without duplication into a combined access control list, and wherein said query processor accesses a component database only after verifying permission to access against said combined access control list.

30. A method as in claim 29 further comprising:

providing, in said database management system, a subscription service which notifies users of updates to documents collected in said logical document database and selected documents in said computer network, when a predetermined criterion is satisfied.

31. A method as in claim 30, further comprising:

providing a process for retrieving new or updated documents responsive to a query when a predetermined condition is satisfied; and creating a repository for including said new or updated documents.

32. A method as in claim 31, wherein said predetermined condition comprises the lapse of a predetermined time interval.

33. A method as in claim 31, wherein said query processor retrieves said new or updated documents over said computer network.

34. A method as in claim 31, wherein said query processor retrieves said new and updated documents from said logical document database.

35. A method as in claim 29, further comprising;

associating with each document of said logical document database meta-information, said meta-information associating (a) each document with objects within said document and (b) each document with other documents.

36. A method as in claim 29, wherein one of said component database comprises documents specified by a semantic definition.

37. A method as in claim 36, wherein said semantic definition includes one or more keywords of documents within said component database.

38. A method as in claim 36, wherein said query processor retrieves documents based on natural language processing rules.

39. A method as in claim 29, wherein said component databases include logical databases.

40. A method as in claim 29, wherein a selected one of said component databases defined by a union of a plurality of databases, including a logical database.

41. A method as in claim 40, wherein said selected one of said component databases comprise a virtual database.

42. A method as in claim 40, wherein said selected one of said component databases comprise a materialized database.

43. A method as in claim 40, wherein said selected one of said component databases comprise both a materialized database and a virtual database.

44. A method as in claim 40, wherein said logical database is associated with one or more keywords of documents within said logical database.

45. A method as in claim 40, wherein said logical database comprise a collection of documents.

46. A method as in claim 45, wherein said collection of documents include virtual documents.

47. A method as in claim 45, wherein said collection of documents include materialized documents.

48. A method as in claim 45, wherein said collection of documents include semi-materialized documents.

49. A method as in claim 45, wherein said documents responsive to a query are retrieved dynamically.

50. A method as in claim 29, wherein said query processor expands a virtual component database to process a query against said virtual database, and process said query against documents included in a materialized component database without expansion.

51. A method as in claim 29, further comprising:

providing a graphical user interface for composing queries for processing by said query processor.

52. A method as in claim 51, wherein said predetermined format comprises hypertext.

53. A method as in claim 29, wherein said query processor further comprises a document generator for returning information retrieved in responsive to a query in a predetermined format.

54. A method as in claim 53, wherein said database management system comprises a physical level database management system and a logical level database management system.

55. A method as in claim 54, wherein said query processor comprises a logical level query processor associated with said logical level database management system and a physical level query processor associated with said physical level database management system, and wherein a query received into said document management system is translated by said logical level query processor into physical level queries for processing by said physical level query processor.

56. A method as in claim 29, wherein said user interface provides a graphical user interface to allow viewing the organization of said document management system.

* * * * *

UNITED STATES PATENT AND TRADEMARK OFFICE
CERTIFICATE OF CORRECTION

PATENT NO. : 6,725,227 B1 Page 1 of 1
DATED : April 20, 2004
INVENTOR(S) : Wen-Syan Li It is certified that error appears in the above-identified patent and that said Letters Patent is hereby corrected as shown below:

Column 1,
Lines 9-10, delete "Oct. 2, 1998, which is assigned to NEC USA, Inc., also the assignee of the present application." and insert -- Oct. 2, 1998. --

Column 5,
Line 43, delete "is" before the first occurrence of "denote".

Signed and Sealed this

Seventh Day of December, 2004

JON W. DUDAS
*Director of the United States Patent and Trademark Office*